US012670829B2

(12) United States Patent
Yim

(10) Patent No.: US 12,670,829 B2
(45) Date of Patent: Jun. 30, 2026

(54) DISPLAY DEVICE

(71) Applicant: Samsung Display Co., LTD., Yongin-si (KR)

(72) Inventor: Dale Yim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/011,148

(22) Filed: Jan. 6, 2025

(65) Prior Publication Data

US 2025/0329280 A1      Oct. 23, 2025

(30) Foreign Application Priority Data

Apr. 23, 2024      (KR) ........................ 10-2024-0054179

(51) Int. Cl.
| | |
|---|---|
| *G09G 3/20* | (2006.01) |
| *G06F 3/041* | (2006.01) |
| *G06F 3/042* | (2006.01) |
| *G06V 40/13* | (2022.01) |
| *G06V 40/145* | (2022.01) |
| G09G 3/3225 | (2016.01) |

(52) U.S. Cl.
CPC ....... *G09G 3/2014* (2013.01); *G06F 3/04166* (2019.05); *G06F 3/042* (2013.01); *G06V 40/1318* (2022.01); *G06V 40/145* (2022.01); *G09G 3/3225* (2013.01); *G09G 2320/0233* (2013.01); *G09G 2320/0242* (2013.01); *G09G 2330/023* (2013.01); *G09G 2354/00* (2013.01); *G09G 2360/16* (2013.01); *G09G 2370/045* (2013.01)

(58) Field of Classification Search
CPC .............. G09G 3/2014; G09G 3/3225; G09G 2320/0233; G09G 2320/0242; G09G 2330/023; G09G 2354/00; G09G 2360/16; G09G 2370/045; G06F 3/04166; G06F 3/042; G06V 40/145; G06V 40/1318; H05B 33/26
See application file for complete search history.

(56) References Cited

U.S. PATENT DOCUMENTS

| | | | |
|---|---|---|---|
| 11,740,659 B2 | 8/2023 | Yim et al. | |
| 2023/0301157 A1* | 9/2023 | Yamazaki | .............. H05B 33/26 |

FOREIGN PATENT DOCUMENTS

| | | |
|---|---|---|
| KR | 10-2020-0026017 A | 3/2020 |
| KR | 10-2022-0049333 A | 4/2022 |
| KR | 10-2489597 B1 | 1/2023 |

* cited by examiner

*Primary Examiner* — Abdul-Samad A Adediran
(74) *Attorney, Agent, or Firm* — Womble Bond Dickinson (US) LLP

(57) ABSTRACT

A display device is disclosed. The display device may include a display panel in which a plurality of pixels may be arranged in a display area to display an image, a scan driver to drive gate lines of the display area, a data driver to drive data lines of the display area, a display driver to sort interpolated image data according to resolution of the display area, to supply the sorted interpolated image data to the data driver, and to control driving timings of the scan driver and the data driver, and a data interpolator to modulate and interpolate image data of pixels, which may be input from an outside, according to driving characteristics of the display panel and to generate and output the interpolated image data.

19 Claims, 11 Drawing Sheets

RCO_Data [ ... 0 0 0 0 1 1 ... )

| PATTERN | 1. CURRENT CONSUMED WHEN LOW POWER IS NOT USED(mA) | 2. CURRENT CONSUMED WHEN LOW POWER IS USED(mA) | DELTA (mA) (2-1) |
|---|---|---|---|
| White | 1.5 | 1.1 | -0.4 |
| Hline | 1.4 | 1.2 | -0.2 |
| checker | 7.6 | 4.8 | -2.8 |

White:

Hline:

checker:

DISPLAY DEVICE

CROSS-REFERENCE TO RELATED APPLICATION

The present application claims priority to and the benefit of Korean Patent Application No. 10-2024-0054179, filed on Apr. 23, 2024, in the Korean Intellectual Property Office, the disclosure of which is incorporated herein in its entirety by reference.

BACKGROUND

1. Field

One or more embodiments of the present disclosure relate to a display device.

2. Description of the Related Art

As the information society develops, the demand for display devices capable of presenting (displaying) images in various suitable forms is increasing. For example, display devices may be applied to various electronic devices, such as smartphones, digital cameras, notebook computers, navigation devices, and/or smart televisions.

The display devices may be flat panel display devices, such as liquid crystal display devices, field emission display devices, and/or organic light emitting display devices. Among these flat panel display devices, an organic light emitting display device may include a light emitting element that enables each pixel of a display panel to emit light independently (by itself). Thus, the organic light emitting display device may display an image without a backlight unit (that provides light to the display panel).

A display device may include a display panel including: data lines; scan signal lines; and a plurality of pixels connected to the data lines and the scan signal lines; a scan driver to supply scan signals to the scan signal lines; a data driver to supply data voltages to the data lines; and a timing controller to control driving timings of the scan driver and the data driver. Additionally, the display device may further include an image data interpolator to interpolate and modulate digital image data input from an external source, such as a graphics driver, according to driving characteristics, such as resolution and driving frequency, of the display panel.

SUMMARY

One or more aspects of embodiments of the present disclosure are directed toward a display device capable of controlling the operation of an image data interpolator which may be to interpolate and modulate image data input from the outside according to the identity, similarity, and/or repetitive characteristics of the image data.

One or more aspects of embodiments of the present disclosure are directed toward a display device capable of comparing image data for red, green, blue, and white pixels in units of at least one bit data and/or partially or entirely controlling an on/off operation of an image data interpolator based on the comparison result.

However, aspects of embodiments of the present disclosure are not restricted to the one set forth herein. The above and other aspects and features of certain embodiments of the present disclosure will become more apparent to one of ordinary skill in the art to which the present disclosure pertains by referencing the detailed description of the present disclosure given.

One or more embodiments of the present disclosure provide a display device including a display panel in which a plurality of pixels are arranged in a display area to display an image, a scan driver to drive gate lines of the display area, a data driver to drive data lines of the display area, a display driver to sort interpolated image data according to resolution of the display area, supply the sorted interpolated image data to the data driver, and control driving timings of the scan driver and the data driver, and a data interpolator to modulate and interpolate image data of pixels, which are input from an outside, according to driving characteristics of the display panel and generate and output the interpolated image data, wherein the data interpolator is arranged to compare image data of adjacent pixels in the process of interpolating the image data of the pixels which are sequentially input and, if (e.g., when) the image data of the adjacent pixels are substantially the same, is arranged to apply previously generated interpolated image data acting or serving as interpolated image data for the image data of the adjacent pixels.

One or more embodiments of the present disclosure provide a display device including a display panel in which a plurality of pixels are arranged in a display area to display an image, a scan driver to drive gate lines of the display area, a data driver to drive data lines of the display area, a display driver to control driving timings of the scan driver and the data driver and sequentially supply interpolated image data to the data driver, and a data interpolator to modulate and interpolate image data of pixels, which are input from an outside, according to driving characteristics of the display panel and generate and output the interpolated image data, wherein the data interpolator is arranged to interpolate grayscale values and luminance values of the image data of the pixels according to at least one selected from among resolution characteristics, chrominance characteristics, and driving frequency characteristics of the display area, compare image data of adjacent pixels in the process of interpolating the image data of the pixels, and, if (e.g., when) the image data of the adjacent pixels are substantially the same, is arranged to apply previously generated interpolated image data acting or serving as interpolated image data for the image data of the adjacent pixels.

A display device according to one or more embodiments of the present disclosure may be to interpolate and modulate digital image data input from the outside according to driving characteristics, such as resolution and driving frequency, of a display panel and display the interpolated and modulated digital image data acting or serving as an image. Therefore, image display quality may be improved or enhanced, and user satisfaction may be increased.

A display device according to one or more embodiments of the present disclosure may be to selectively control the operation timing of an image data interpolator according to the identity, similarity, and/or repetitive characteristics of image data of red, green, blue, and white pixels. Therefore, power consumption (or a degree or occurrence of power consumption) due to an image data interpolation operation may be reduced.

One or more embodiments of the present disclosure provide an electronic device including a display device as described in one or more embodiments. The display device includes: a display panel; display pixels in a display area of the display panel; light sensing pixels in the display area together with the display pixels; infrared light emitting pixels in the display area together with the display pixels; a display scan driver to drive the display pixels and the light sensing pixels to emit light; a light sensing scan driver to drive the light sensing pixels to detect light; and a main driving circuit to detect pulse wave signals of a user utilizing light sensing signals received through the light sensing pixels and to measure biometric information, wherein the main driving circuit is to separate and to generate blood vessel image data from image data for a touch area during a user's touch position detection period and to receive the light sensing signals of a light receiving area by distinguishing the light receiving area according to the blood vessel image data in the display area during a user's biometric information detection period.

However, the aspects, effects, and/or embodiments of the present disclosure are not restricted to the one set forth herein. The above and other aspects, effects, and/or embodiments of the present disclosure will become more apparent to one of daily skill in the art to which the present disclosure pertains by referencing the claims.

BRIEF DESCRIPTION OF THE DRAWINGS

The above and other aspects and features of certain embodiments of the present disclosure will become more apparent and more readily appreciated from the following description of one or more embodiments, taken in conjunction with the accompanying drawings in which:

FIG. 7 is a detailed block diagram of a first embodiment of a first serial comparison circuit unit illustrated in FIG. 5;

FIG. 8 is a diagram illustrating a data interpolation operation of the first data modulation circuit unit illustrated in FIG. 5;

DETAILED DESCRIPTION

The subject matter of the present disclosure will be described more fully hereinafter with reference to the accompanying drawings, in which embodiments of the present disclosure are shown. The subject matter of the present disclosure may, however, be embodied in different forms and should not be construed as being limited to one or more embodiments set forth herein. Rather, these embodiments are provided as examples so that this disclosure will be thorough and complete, and will fully convey the aspects and features of the present disclosure to those skilled in the art.

It will also be understood that if (e.g., when) a layer is referred to as being "on" another layer or substrate, it can be directly on the other layer or substrate, or intervening layers may also be present. Substantially the same reference numbers indicate substantially the same components throughout the specification. In contrast, if (e.g., when) an element is referred to as being "directly on" another element, there are no intervening elements present.

It will be understood that, although the terms "first," "second," and/or the like, may be used herein to describe one or more suitable elements, these elements should not be limited by these terms. These terms are only used to distinguish one element from another element. For instance, a first element discussed may be termed a second element without departing from the teachings of the present disclosure. Similarly, the second element may also be termed the first element.

Each of the features of one or more suitable embodiments of the present disclosure may be combined or combined with each other, in part or in whole, and may be technically one or more suitable interlocking and driving. Each embodiment may be implemented independently of each other or may be implemented together in an association.

Hereinafter, specific embodiments will be described with reference to the accompanying drawings.

Figure 1:
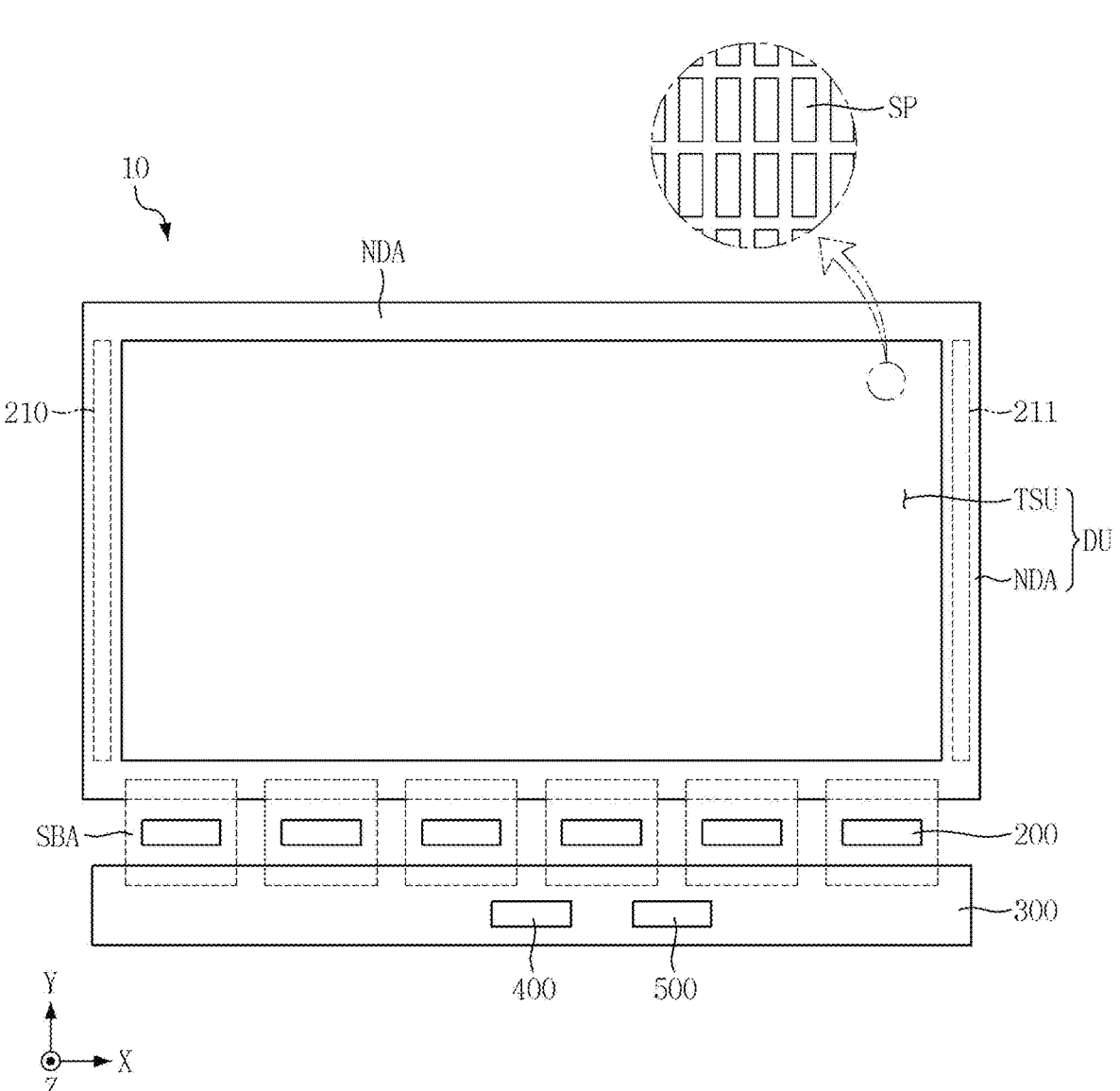
FIG. 1 is a plan view of a display device according to one or more embodiments of the present disclosure.
Figure 2:
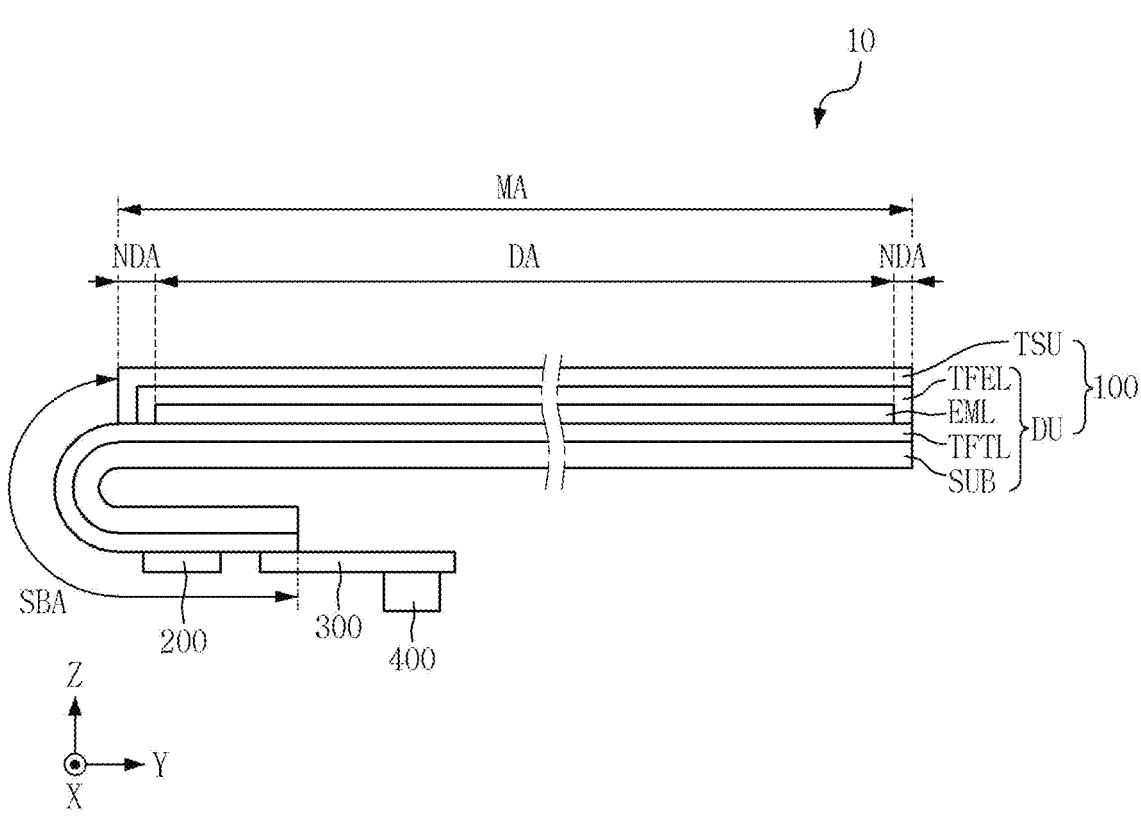
FIG. 2 is a detailed lateral cross-sectional view of the display device of FIG. 1.

FIG. 1 is a plan view of a display device 10 according to one or more embodiments of the present disclosure. FIG. 2 is a detailed lateral cross-sectional view of the display device 10 of FIG. 1.

Referring to FIGS. 1 and 2, the display device 10 according to one or more embodiments may be applied to portable electronic devices, such as tablet personal computers (PCs), portable multimedia players (PMPs), navigation devices, ultra-mobile PCs (UMPCs), electronic books, electronic notebooks, mobile phones, smartphones, mobile communication terminals, and/or the like. For example, the display device 10 may be applied acting or serving as a display unit of a television, a notebook computer, a monitor, a billboard, an Internet of things (IoT) device, and/or the like.

An organic light emitting display device will be described in more detail as an example of the display device 10 according to one or more embodiments. Unless a special distinction is desired or required, the organic light emitting display device applied to one or more embodiments may be shortened to the display device 10. However, the display device 10 according to one or more embodiments is not limited to the organic light emitting display device, and other display devices listed above or suitable in the art may also be applied within the scope sharing the technical spirit.

The display device 10 according to one or more embodiments may have a rectangular shape (e.g., a substantially rectangular shape), a square shape (e.g., a substantially square shape), a circular shape (e.g., a substantially circular shape), an oval shape (e.g., a substantially oval shape), or a quadrate shape (e.g., a substantially quadrate shape) in plan view. If (e.g., when) the display device 10 is a mobile device, such as a tablet PC, it may have a rectangular shape (e.g., a substantially rectangular shape) with its long sides located or arranged in a horizontal direction. However, embodiments of the present disclosure are not limited thereto, and the long sides may also be located or arranged in a vertical direction, or the display device 10 may be rotatably installed or arranged so that the long sides may be variably located or arranged in the horizontal or vertical direction.

The display device 10 may include a display panel 100, a touch sensing unit TSU, a first scan driver 210, a second scan driver 211, a data driver 200, a display driver 400, and/or a data interpolator 500.

The display panel 100 of the display device 10 may include a display unit DU which may be configured to display an image, and/or the touch sensing unit TSU which may be configured to detect a touch of a human body part, such as a finger and/or an electronic pen, may be arranged on the display panel 100. The display unit DU of the display panel 100 may include a plurality of pixels SP that may be configured to respectively display red, green, and blue and may be configured to display an image through the pixels SP. In one or more embodiments, the display unit DU may also include a plurality of pixels SP arranged to respectively display red, green, blue, and white. Every three pixels SP to respectively display red, green, and blue may be defined as one unit pixel. In one or more embodiments, every four pixels SP to respectively display red, green, blue, and white colors may be defined as one unit pixel.

The touch sensing unit TSU may be mounted on the front of the display panel 100 or may be formed or arranged integrally with the display panel 100. The touch sensing unit TSU may include a plurality of touch electrodes and may be configured to detect a user's touch in a capacitive manner using the touch electrodes.

A first scan driver 210 may be configured to supply a first gate scan signal to the pixels SP for each horizontal line through a first gate line for each horizontal line of the display unit DU based on a gate control signal from the display driver 400. The first scan driver 210 may be configured to drive the pixels SP arranged for each horizontal line by sequentially supplying gate scan signals to the gate lines for the horizontal lines, so that the pixels SP may be sequentially charged with data voltages. A second scan driver 211 may be configured to supply second gate scan signals to second gate lines for the horizontal lines of the display unit DU based on a gate control signal. The second scan driver 211 may be configured to control pixel driving voltages of the pixels SP to be output to light emitting elements on a horizontal line-by-horizontal line basis by sequentially supplying the second gate scan signals to the second gate lines for the horizontal lines.

The data driver 200 may include a plurality of data driving integrated circuits. The data driver 200 may be configured to output data voltages according to image data to the pixels SP of the display unit DU based on a data driving control signal from the display driver 400. The data driving integrated circuits may be configured to supply the data voltages to data lines, to which the pixels SP may be connected, on a horizontal line-by-horizontal line basis every horizontal period.

The display driver 400 may be configured to operate (e.g., may act or serve) as a main processor or may be formed or provided integrally with the main processor. In one or more embodiments, the display driver 400 may be configured to control the overall function of the display device 10. For example, the display driver 400 may be configured to sort image data, which may be modulated and interpolated through the data interpolator 500, according to the resolution of the display unit DU and supply the sorted image data to the data driving integrated circuits of the data driver 200. In one or more embodiments, the display driver 400 may be configured to control the data voltage output timing of the data driver 200 and the gate scan signal output timings of the first scan driver 210 and the second scan driver 211. In one or more embodiments, the display driver 400 may be configured to generate data control signals to control the data voltage output timings of the data driving integrated circuits included in the data driver 200.

The display driver 400 may be configured to detect touch coordinate information included in touch data of the touch sensing unit TSU and then generate digital video data according to the touch coordinate information. In one or more embodiments, the display driver 400 may be configured to execute an application indicated by an icon displayed at a user's touch coordinates. For another example, the display driver 400 may be configured to receive coordinate data from an electronic pen, determine touch coordinates of the electronic pen, and then generate digital video data according to the touch coordinates or execute an application indicated by an icon displayed at the touch coordinates of the electronic pen.

The data interpolator 500 may be configured to modulate and interpolate digital image data input from an external source, such as a graphics system, according to driving characteristics, such as resolution and driving frequency, of the display panel 100 and supply the modulated and interpolated digital image data to the display driver 400. For example, the data interpolator 500 may be configured to interpolate a grayscale value and a luminance value of digital image data of each pixel SP according to the resolution characteristics and chrominance characteristics of the display unit DU and sequentially supply the interpolated image data to the display driver 400. In this process, 8-bit digital image data of each pixel SP may be modulated and interpolated into 10-bit image data, and the 10-bit image data may be sequentially supplied to the display driver 400.

If (e.g., when) the data interpolator 500 modulates and interpolates all digital image data of the pixels SP and outputs the modulated and interpolated data, it may continuously (e.g., substantially continuously) consume power during a driving period of the display panel 100. In order to reduce power consumption (or to reduce a degree or occurrence of power consumption), the data interpolator 500 may be configured to compare image data of adjacent pixels SP and copy and output substantially the same interpolated image data for substantially the same image data. The data interpolator 500 may be configured to interpolate image data of the pixels SP while comparing image data of adjacent pixels SP and, if (e.g., when) the image data of the adjacent pixels SP are substantially the same, may be configured to copy and apply substantially the same interpolated image data and output substantially the same interpolated image data. In other words, to save power, the data interpolator 500 may compare the image data of neighboring pixels. If (e.g., when) the data is substantially the same (e.g., the same), it may refuse substantially the same interpolated data instead of processing it anew, thereby reducing power consumption during the display panel's operation.

For example, the data interpolator 500 may be configured to sequentially compare image data of red, green, and blue (or red, green, blue, and white) pixels SP, which may be input in series and parallel from the outside, in serial and parallel states and detect the identity, similarity, and/or repetitive characteristics of image data of adjacent pixels SP in serial and parallel structures. The data interpolator 500 may be configured to compare image data of adjacent pixels SP, which may be input in the serial and parallel structures, in units of at least one bit data and detect substantially the same image data for adjacent pixels SP of substantially the same color. Then, for image data of pixels SP which may be substantially the same among image data of the adjacent pixels SP of substantially the same color, the data interpolator 500 may be configured to copy previously generated interpolated image data of a pixel SP having substantially the same color and image data and apply the copied interpolated image data acting or serving as interpolated image data. In this way, the data interpolator 500 may stop modulation and interpolation operations for pixels SP whose image data may be substantially the same among adjacent pixels SP and may copy and output previously generated interpolated image data of an adjacent pixel SP having substantially the same image data. Therefore, it may reduce the power consumed for each period (or reduce a degree or occurrence of the power consumed for each period) during which the modulation and interpolation operations are stopped. In other words, the data interpolator 500 may compare the image data of red, green, and blue (or red, green, blue, and white) pixels that are input in series and parallel. If (e.g., when) it finds that adjacent pixels have substantially the same (e.g., the same) image data, it may refuse previously generated interpolated data instead of processing new data. This approach may help reduce power consumption by stopping unnecessary modulation and interpolation operations for pixels with similar data.

In one or more embodiments and on the other hand, for image data of pixels SP whose image data are not substantially the same among the adjacent pixels SP of substantially the same color for each of red, green, and blue, the data interpolator 500 may be configured to generate interpolated image data by interpolating grayscale or luminance values and/or number of bits according to preset interpolation characteristics. In other words, if (e.g., when) adjacent pixels of substantially the same color have different image data (e.g., substantially different image data), the data interpolator 500 may create new interpolated image data by modifying the grayscale or brightness levels and the number of bits according to predefined settings.

Figure 3:
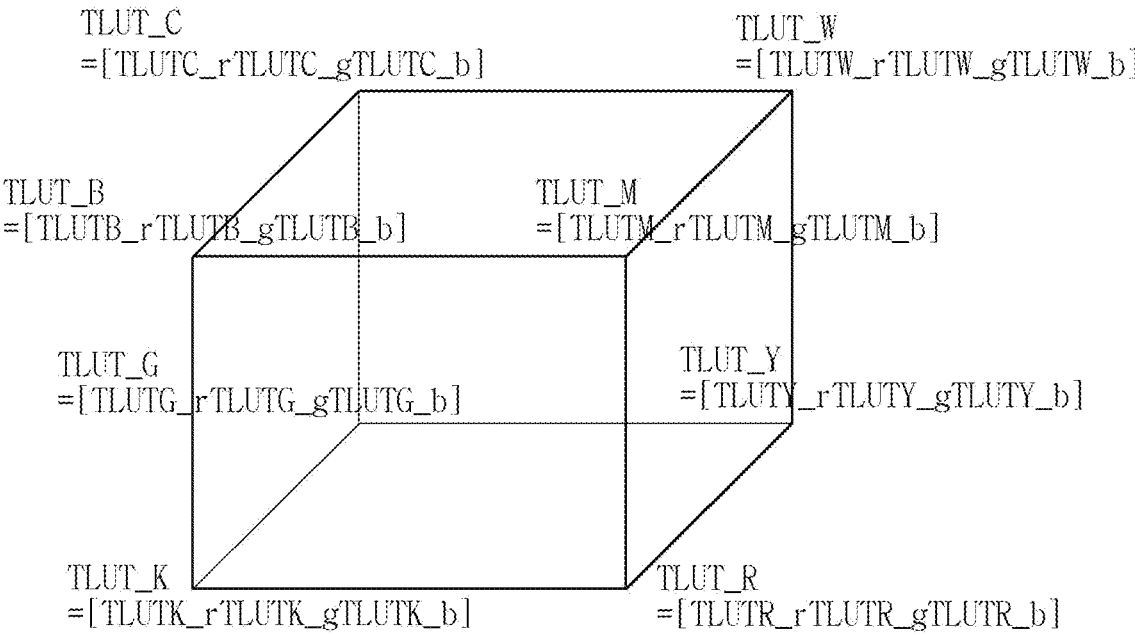
FIG. 3 is a diagram illustrating image data operation and interpolation characteristics of a data interpolator according to one or more embodiments.

FIG. 3 is a diagram illustrating image data operation and interpolation characteristics of the data interpolator 500 according to one or more embodiments.

Referring to FIG. 3, for image data of pixels SP which are not substantially the same among image data of adjacent pixels SP of substantially the same color for each of red, green, and blue, grayscale or luminance values and/or number of bits may be interpolated by performing calculations according to a preset mathematical equation.

For example, red modulated data T_r, green modulated data T_g, and blue modulated data T_b may be generated according to Equations 1 through 3, respectively, with reference to FIG. 3 and Table 1. In one or more embodiments, TLUT_R, TLUT_G, TLUT_B, TLUT_C, TLUT_M, TLUT_Y, and TLUT_K may all be set to 8-bit data values. For example, data values of 256 grayscale levels may be included.

$$T\_r = TLUTK\_r + C1\_r \times i\_r/r\_step \text{ (e.g., act or task)} + \qquad (1)$$

$$C2\_r \times i\_g/g\_step \text{ (e.g., act or task)} +$$

$$C3\_r \times i\_b/b\_step \text{ (e.g., act or task)}.$$

$$T\_g = TLUTK\_g + C1\_g \times i\_r/r\_step \text{ (e.g., act or task)} + \qquad (2)$$

$$C2\_g \times i\_g/g\_step \text{ (e.g., act or task)} +$$

$$C3\_g \times i\_b/b\_step \text{ (e.g., act or task)}.$$

$$T\_b = TLUTK\_b + C1\_b \times i\_r/r\_step \text{ (e.g., act or task)} + \qquad (3)$$

$$C2\_g \times i\_g/g\_step \text{ (e.g., act or task)} +$$

$$C3\_b \times i\_b/b\_step \text{ (e.g., act or task)}.$$

G_r, g_g, and g_b shown in Table 1 represent condition information for each case (A1 through A6) and may include grayscale or luminance values of image data according to image characteristics, such as moving images. In one or more embodiments, in the above equations, r_step (e.g., act or task), g_step (e.g., act or task), and b_step (e.g., act or task) may be preset to an arbitrary grayscale value of 128.

Referring to Table 1, the data interpolator 500 may be configured to receive and store TLUT_R, TLUT_G, TLUT_B, TLUT_C, TLUT_M, TLUT_Y, and TLUT_K data values in a preset range. In one or more embodiments, the data interpolator 500 may be configured to receive TLUTR_r/g/b, TLUTG_r/g/b, TLUTB_r/g/b, TLUTC_r/g/b, TLUTM_r/g/b, TLUTY_r/g/b, and TLUTK_r/g/b data values acting or serving as image data values for each of red, green, and blue. In one or more embodiments, the data interpolator 500 may be configured to output the red modulated data T_r, the green modulated data T_g, and the blue modulated data T_b acting or serving as result data which respectively may include red, green, and blue data values

TABLE 1

| Case | Condition | C1_r | C1_g | C1_b | C2_r | C2_g | C2_b | C3_r | C3_g | C3_b |
|------|-----------|------|------|------|------|------|------|------|------|------|
| A1 | g_r > g_g > g_b | TLUTR_r- TLUTK_r | TLUTR_g- TLUTK_g | TLUTR_b- TLUTK_b | TLUTC_r- TLUTR_r | TLUTC_g- TLUTR_g | TLUTC_b- TLUTR_b | TLUTW_r- TLUTY_r | TLUTW_g- TLUTY_g | TLUTW_b- TLUTY_b |
| A2 | g_r > g_b > g_g | TLUTR_r- TLUTK_r | TLUTR_g- TLUTK_g | TLUTR_b- TLUTK_b | TLUTW_r- TLUTM_r | TLUTW_g- TLUTM_g | TLUTW_b- TLUTM_b | TLUTM_r- TLUTR_r | TLUTM_g- TLUTR_g | TLUTM_b- TLUTR_b |
| A3 | g_b > g_r > g_b | TLUTM_r- TLUTB_r | TLUTM_g- TLUTB_g | TLUTM_b- TLUTB_b | TLUTW_r- TLUTM_r | TLUTW_g- TLUTM_g | TLUTW_b- TLUTM_b | TLUTB_r- TLUTK_r | TLUTB_g- TLUTK_g | TLUTB_b- TLUTK_b |
| A4 | g_g > g_r > g_b | TLUTW_r- TLUTC_r | TLUTW_g- TLUTC_g | TLUTW_b TLUTC_b | TLUTG_r- TLUTK_r | TLUTG_g- TLUTK_g | TLUTG_b- TLUTK_b | TLUTW_r- TLUTY_r | TLUTW_g- TLUTY_g | TLUTW_b- TLUTY_b |
| A5 | g_g > g_b > g_b | TLUTW_r- TLUTC_r | TLUTW_g- TLUTC_g | TLUTW_b- TLUTC_b | TLUTG_r- TLUTK_r | TLUTG_g TLUTK_g | TLUTG_b- TLUTK_b | TLUTC_r- TLUTG_r | TLUTC_g- TLUTG_g | TLUTC_b- TLUTG_b |
| A6 | g_b > g_g > g_r | TLUTR_r- TLUTK_r | TLUTR_g- TLUTK_g | TLUTR_b- TLUTK_b | TLUTC_r- TLUTB_r | TLUTC_g- TLUTB_g | TLUTC_b- TLUTB_b | TLUTB_r- TLUTK_r | TLUTB_g- TLUTK_g | TLUTB_b- TLUTK_b | according to the results of calculations using Equations 1 through 3 within the range of interpolated data values shown as a cube in FIG. 3.

Referring to FIG. 2, the display panel 100 may be divided into a main area MA and a sub-area SBA. The main area MA may include a display area DA having the pixels SP to display an image and a non-display area NDA arranged around the display area DA. In the display area DA, light may be emitted from an emission area or opening area of each pixel SP to display an image. To this end, each pixel SP of the display area DA may include a pixel circuit including switching elements, a pixel defining layer to define an emission area or an opening area, and a self-light emitting element.

The non-display area NDA may be any one peripheral area selected from the display area DA or an area outside the display area DA. The non-display area NDA may be defined as an edge area of the main area MA of the display panel 100. In the non-display area NDA, fan-out lines connecting the first scan driver 210, the second scan driver 211, the data driver 200, and the display driver 400 to the display area DA may be formed or arranged.

The sub-area SBA may extend from a side of the main area MA. The sub-area SBA may be of a flexible film that may be bent, folded, rolled, and/or the like. For example, if (e.g., when) the sub-area SBA is bent, it may be overlapped by the main area MA in a thickness direction (Z-axis direction). The sub-area SBA may include the data driver 200 and a pad unit connected to a circuit board 300. In one or more embodiments, the sub-area SBA may not be provided, and the data driver 200 and/or the pad unit may be arranged in the non-display area NDA.

The data driver 200 may be formed or configure to act or serve as a plurality of integrated circuits and mounted on the display panel 100 using a chip on glass (COG) method, a chip on plastic (COP) method, and/or an ultrasonic bonding method. For example, the data driver 200 may be arranged in the sub-area SBA and may be overlapped by the main area MA in the thickness direction (Z-axis direction) by the bending of the sub-area SBA. For another example, the data driver 200 may be mounted on the circuit board 300.

The circuit board 300 may be electrically connected to the pad unit of the display panel 100 by an anisotropic conductive film (ACF). In one or more embodiments, lead lines of the circuit board 300 may be electrically connected to the pad unit of the display panel 100. The circuit board 300 may be a flexible printed circuit board, a printed circuit board, and/or a flexible film, such as a chip on film.

The display driver 400 and the data interpolator 500 may be mounted on the circuit board 300. The display driver 400 and the data interpolator 500 may be formed or arranged acting or serving as integrated circuits.

Figure 4:
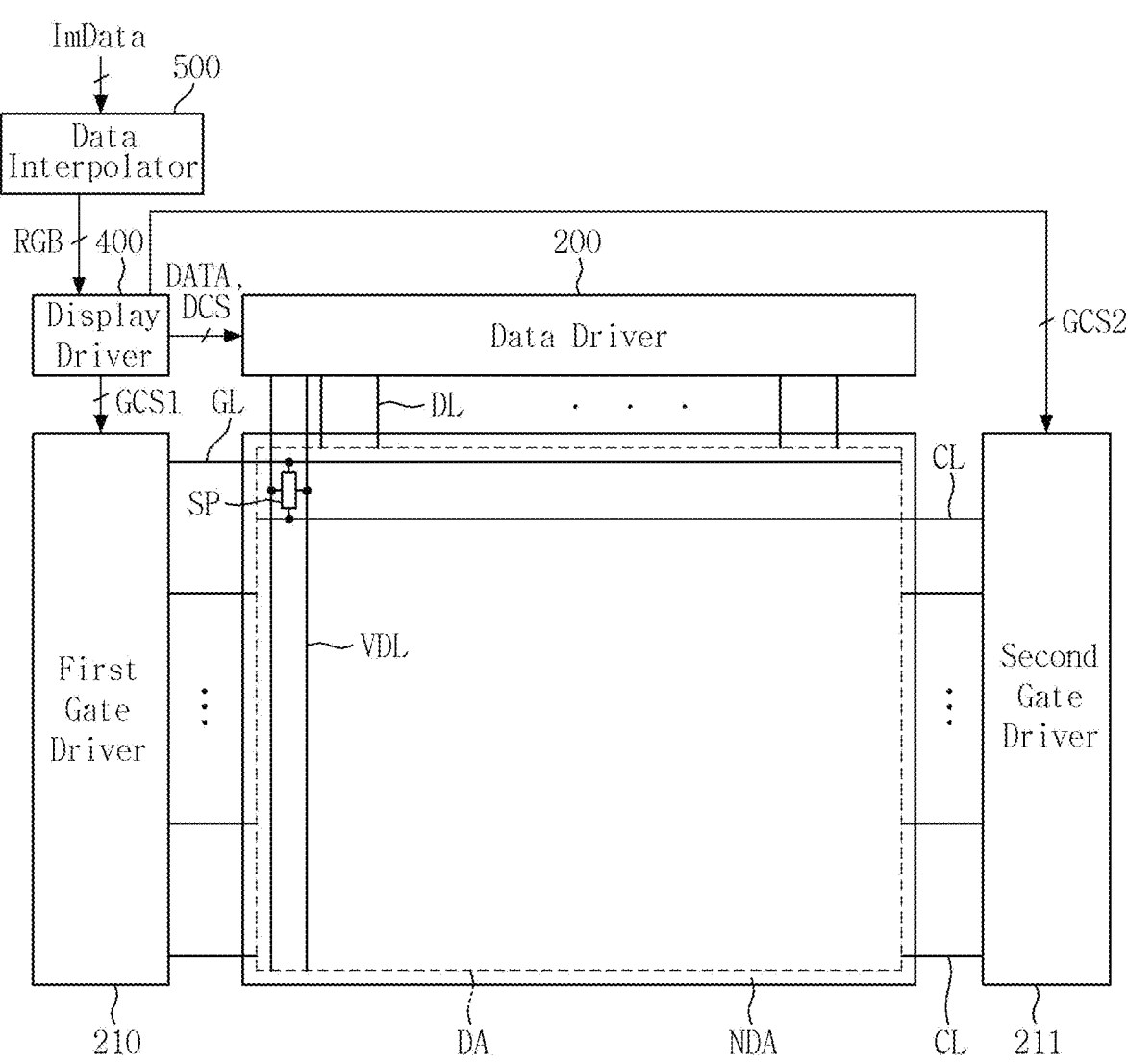
FIG. 4 is a block diagram illustrating an electrical connection relationship between a display panel and drivers illustrated in FIGS. 1 and 2.

FIG. 4 is a block diagram illustrating an electrical connection relationship between the display panel 100 and the drivers illustrated in FIGS. 1 and 2.

Referring to FIG. 4, a plurality of pixels SP may be arranged in a matrix structure in the display area DA. In one or more embodiments, a plurality of first gate lines GL, each connected to the pixels SP for a horizontal line, and a plurality of second gate lines CL, each connected to the pixels SP for a horizontal line, may be arranged in the display area DA and/or the non-display area NDA.

The first gate lines GL and the second gate lines CL may extend in an X-axis direction which may be a first horizontal direction and may be spaced and/or apart (e.g., spaced apart or separated) from each other in a first vertical direction intersecting the first horizontal direction. The first gate lines GL and the second gate lines CL may be arranged at regular intervals (e.g. at substantially regular intervals) along the first vertical direction.

The first scan driver 210 may be configured to supply a first gate scan signal to the pixels SP for each horizontal line through a first gate lines GL for each horizontal line based on a gate control signal GCS from the display driver 400. The first gate lines GL may be configured to sequentially supply first gate scan signals, which may be sequentially generated in each horizontal period from the first scan driver 210, to the pixels SP on a horizontal line-by-horizontal line basis.

The second scan driver 211 may be configured to control pixel driving voltages of the pixels SP to be respectively output to light emitting elements on a horizontal line-by-horizontal line basis by sequentially supplying second gate scan signals to the second gate lines CL for the horizontal lines. The second gate lines CL may be configured to sequentially supply the second gate scan signals, which may be sequentially generated in each horizontal period from the second scan driver 211, to the pixels SP on a horizontal line-by-horizontal line basis.

The first gate scan signals of the first scan driver 210 and the second gate scan signals of the second scan driver 211 may be generated alternately at different timings in each horizontal period. For example, a first gate scan signal may first be supplied to a first gate line GL in each horizontal period, and then a second gate scan signal may be supplied to a second gate line CL according to the driving order of thin-film transistors formed or arranged in each pixel SP.

In one or more embodiments, a plurality of data lines DL, each connected to the pixels SP for a vertical line, may be arranged in the display area DA and/or the non-display area NDA. The data lines DL may be electrically connected to the data driver 200. A data voltage may determine an emission luminance of each of the pixels SP. In one or more embodiments, a plurality of voltage detection lines VDL, each connected to the pixels SP for a vertical line, may be arranged in the display area DA and/or the non-display area NDA. The voltage detection lines VDL may be electrically connected to the data driver 200.

The data interpolator 500 may be configured to interpolate grayscale values and luminance values of digital image data ImData of the pixels SP, which may be input from the outside, according to the resolution characteristics and chrominance characteristics of the display unit DU and sequentially supply interpolated image data RGB to the display driver 400. In one or more embodiments, the data interpolator 500 may be configured to sequentially compare the digital image data ImData of red, green, blue, and white pixels SP, which may be input in series and parallel from the outside, in serial and parallel states. Then, the data interpolator 500 may be configured to generate interpolated image data for image data of pixels SP whose image data may be different among image data of adjacent pixels SP of substantially the same color by interpolating grayscale or luminance values or number of bits of the image data according to preset interpolation characteristics. In one or more embodiments and on the other hand, for image data of pixels SP whose image data may be substantially the same among the image data of the adjacent pixels SP of substantially the same color, the data interpolator 500 may be configured to copy interpolated image data RGB of an adjacent pixel SP having substantially the same image data and output the copied interpolated image data RGB acting or serving as interpolated image data RGB. In other words, the data interpolator 500 may adjust grayscale and brightness values of incoming digital image data based on the display unit's characteristics and supply this data to the display driver. It may compare the image data of red, green, blue, and white pixels. If (e.g., when) adjacent pixels have different data (e.g., does not have substantially the same date), it may generate new interpolated data. If (e.g., when) adjacent pixels have substantially the same data, it may refuse the interpolated data from neighboring pixels, reducing the need for new calculations.

The display driver 400 may be configured to receive timing synchronization signals through an external graphics system and sequentially receive the interpolated image data RGB of the pixels SP from the data interpolator 500. The display driver 400 may be configured to sequentially sort the interpolated image data RGB of the pixels SP, which may be sequentially received, in units of at least one frame.

The display driver 400 may be configured to control the operation timing of the data driver 200 by generating a data driving control signal DCS based on the timing synchronization signals. In one or more embodiments, the display driver 400 may be configured to control the operation timing of the data driver 200 by sequentially supplying the interpolated image data RGB, which may be sorted in units of at least one frame, to the data driver 200 and supplying data driving control signals DCS to the data driver 200. In one or more embodiments, the display driver 400 may be configured to control the operation timings of the first scan driver 210 and the second scan driver 211 independently by generating the gate driving control signals GCS and supplying them to the first scan driver 210 and the second scan driver 211.

The data driving integrated circuits of the data driver 200 may be configured to output data voltages according to interpolated digital data DATA to the pixels SP of the display unit DU based on the data driving control signal DCS. The data driving integrated circuits may be configured to supply the data voltages to the data lines DL, to which the pixels SP may be connected, on a horizontal line-by-horizontal line basis every horizontal period.

Figure 5:
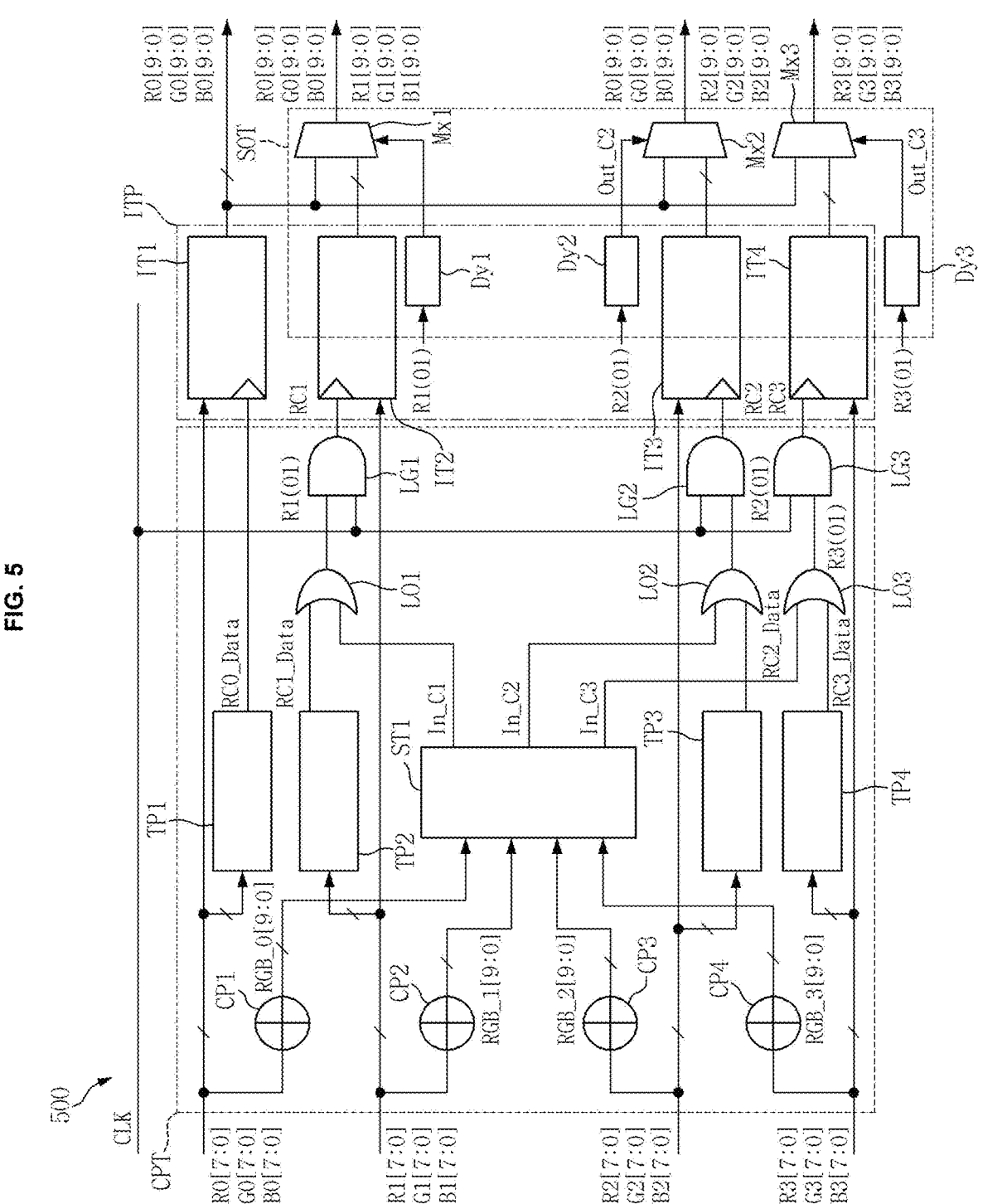
FIG. 5 is a detailed block diagram of the data interpolator illustrated in FIG. 4.

FIG. 5 is a detailed block diagram of the data interpolator 500 illustrated in FIG. 4.

Referring to FIG. 5, the data interpolator 500 may include a data comparison unit CPT, a modulation circuit unit ITP, and/or a selective output unit SOT.

The data comparison unit CPT may be configured to sequentially compare image data ImData of pixels SP, which may be input in series and parallel from the outside, in serial and parallel structures and output result signal data RC0_Data, RC1, RC2, and RC3, which may be generated based on the result of comparing the image data ImData, in the serial and parallel structures according to the input structure of the image data ImData.

The image data ImData of the pixels SP from the outside may be input in an 8-bit [7:0] size for each of red, green, and blue pixels SP, and image data ImData of red, green, and blue pixels SP that constitute each unit pixel may be sequentially input in series through each communication line. In one or more embodiments, the image data ImData of the red, green, and blue pixels SP (e.g., 8-bit [7:0] data for R0, G0, and B0) that constitute each unit pixel may be sequentially input in series through each first communication line.

In one or more embodiments, image data ImData of other adjacent red, green, and blue pixels SP (e.g., 8-bit [7:0] data of R1, G1, and B1) may be sequentially input in series through a second communication line connected in parallel. In one or more embodiments, image data ImData of other adjacent red, green, and blue pixels SP (e.g., 8-bit [7:0] data of R2, G2, and B2) may be sequentially input in series through a third communication line connected in parallel. In one or more embodiments, image data ImData of other adjacent red, green, and blue pixels SP (e.g., 8-bit [7:0] data of R3, G3, and B3) may be sequentially input in series through a fourth communication line.

Referring to FIG. 5, the data comparison unit CPT may include a plurality of serial comparison circuit units TP1 through TP4, at least one parallel comparison circuit unit ST1, a plurality of first logic gate circuits LO1 through LO3, and/or a plurality of second logic gate circuits LG1 through LG3 acting or serving as components to sequentially compare the image data ImData of the pixels SP, which may be input in the serial and parallel structures, in the serial and parallel states. In one or more embodiments, the data comparison unit CPT may further include a plurality of compression circuits CP1 through CP4 which may compress the number of bits of the image data ImData of the pixels SP input in the serial structure through the communication lines, respectively.

The serial comparison circuit units TP1 through TP4 may be configured to sequentially receive compressed image data RGB_0[9:0], RGB_1[9:0], RGB_2[9:0], and RGB_3[9:0] of the pixels SP through the compression circuits CP1 through CP4 connected thereto in series, respectively. Each of the serial comparison circuit units TP1 through TP4 may be configured to sequentially compare adjacent image data of substantially the same color in the compressed image data RGB_0[9:0], RGB_1[9:0], RGB_2[9:0], or RGB_3[9:0] sequentially input in the serial structure.

The serial comparison circuit units TP1 through TP4 may also be configured to sequentially receive the image data ImData of the pixels SP in the serial structure through the communication lines, respectively. In one or more embodiments, each of the serial comparison circuit units TP1 through TP4 may be configured to sequentially compare adjacent image data of substantially the same color in the image data ImData sequentially input in the serial structure. In one or more embodiments, each of the serial comparison circuit units TP1 through TP4 may be configured to separate and classify the image data ImData sequentially input in the serial structure into red, green, and blue image data and sequentially compare adjacent image data of substantially the same color. In one or more embodiments, each of the serial comparison circuit units TP1 through TP4 may be configured to use memory, such as a plurality of look-up tables. Each of the serial comparison circuit units TP1 through TP4 may be configured to sequentially output result signal data RC0_Data, RC1_Data, RC2_Data, or RC3_Data according to the result of comparing adjacent image data of substantially the same color in the serial structure.

For example, a first serial comparison circuit unit TP1 among the serial comparison circuit units TP1 through TP4 may be configured to separate and classify image data ImData, which may be sequentially input through the first communication line, into red, green, and blue image data R0[7:0], G0[7:0], and B0[7:0] and sequentially compare image data of adjacent pixels SP of substantially the same color for each of red, green, and blue. The first serial comparison circuit unit TP1 may be configured to output result signal data RC0_Data for each of red, green, and blue according to the result of comparing adjacent image data of substantially the same color for each of red, green, and blue. In one or more embodiments, if (e.g., when) image data are substantially the same, high logic-level bit data "1", "11", "111 . . . " may be output, and if (e.g., when) the image data are different, low logic-level bit data "0", "00", "000 . . . " may be output.

A second serial comparison circuit unit TP2 among the serial comparison circuit units TP1 through TP4 may be configured to separate and classify image data ImData, which may be sequentially input through the second communication line, into red, green, and blue image data R1[7:0], G1[7:0], and B1[7:0] and sequentially compare adjacent image data of substantially the same color for each of red, green, and blue. The second serial comparison circuit unit TP2 may be configured to output result signal data RC0_Data or RC1_Data for each of red, green, and blue according to the result of comparing adjacent image data of substantially the same color for each of red, green, and blue.

A third serial comparison circuit unit TP3 among the serial comparison circuit units TP1 through TP4 may be configured to separate and classify image data ImData, which may be sequentially input through the third communication line, into red, green, and blue image data R2[7:0], G2[7:0], and B2[7:0] and sequentially compare adjacent image data of substantially the same color for each of red, green, and blue. The third serial comparison circuit unit TP3 may be configured to output result signal data RC0_Data or RC2_Data for each of red, green, and blue according to the result of comparing adjacent image data of substantially the same color for each of red, green, and blue.

A fourth serial comparison circuit unit TP4 among the serial comparison circuit units TP1 through TP4 may be configured to separate and classify image data ImData, which may be sequentially input through the fourth communication line, into red, green, and blue image data R3[7:0], G3[7:0], and B3[7:0] and sequentially compare adjacent image data of substantially the same color for each of red, green, and blue. The fourth serial comparison circuit unit TP4 may be configured to output result signal data RC0_Data or RC3_Data for each of red, green, and blue according to the result of comparing adjacent image data of substantially the same color for each of red, green, and blue.

At least one parallel comparison circuit unit ST1 may be configured to sequentially compare, for each color, the image data ImData of the red, green, and blue pixels SP, which may be input in the parallel structure through the second through fourth communication lines in the parallel structure, with the image data ImData of the red, green, and blue pixels SP which may be input through the first communication line in the parallel structure. Then, the parallel comparison circuit unit ST1 may be configured to output substantially identical data judgement signals In_C1, In_C2, and In_C3 respectively for the second through fourth communication lines in the parallel structure based on the comparison results.

For example, the parallel comparison circuit unit ST1 may be configured to separate and classify red, green, and blue image data, which may be input through the second through fourth communication lines in the parallel structure, by communication line and color and compare the red, green, and blue image data with red, green, and blue image data R0[7:0], G0[7:0], and B0[7:0] sequentially input through the first communication line. Then, based on the comparison results, the substantially identical data judgement signals In_C1, In_C2, and In_C3 for the red, green, and blue image data may be output for the second through fourth communication lines, respectively. The substantially identical data judgement signals In_C1, In_C2, and In_C3 may be separated and classified by color and output accordingly. In one or more embodiments, the substantially identical data judgement signals In_C1, In_C2, and In_C3 may be mixed such that they may alternate by color (red, green, and blue) and may be output accordingly.

The first logic gate circuits LO1 through LO3 may be configured to respectively output synchronous signals R1(01), R2(01), and R1(03) indicating whether image data of pixels SP are substantially the same based on the result of comparing image data of pixels SP of substantially the same color in the serial and parallel structures through the serial comparison circuit units TP1 through TP4 and the parallel comparison circuit unit ST1.

The first logic gate circuits LO1 through LO3 may be configured to respectively output the synchronous signals R1(01), R2(01), and R1(03) indicating that image data may be substantially the same when determining that the image data are substantially the same based on the result of comparing the image data in at least any one structure among the results of comparing the image data in the serial and parallel structures. In one or more embodiments, each of the first logic gate circuits LO1 through LO3 may be configured to compare and analyze any of the result signal data RC0_Data, RC1_Data, RC2_Data, and RC3_Data of the serial comparison circuit units TP1 through TP4 with any one selected from among the substantially identical data judgement signals In_C1, In_C2, and In_C3 for the second through fourth communication lines, respectively. Then, the first logic gate circuits LO1 through LO3 may be configured to respectively output the synchronous signals R1(01), R2(01), and R1(03) of the image data of the pixels SP according to the result of comparing high or low logic-level bit data.

The second logic gate circuits LG1 through LG3 may be configured to match the synchronous signals R1(01), R2(01), and R3(01), which may be generated if (e.g., when) it is determined that image data are substantially the same based on the comparison result in at least one selected from among the serial and parallel structures, with output timings of timing clock signals CLK and sequentially output the matching results. In one or more embodiments, each of the result signal data RC0_Data, RC1_Data, RC2_Data, or RC3_Data may be output (e.g., may act or serve as a combination of a synchronous signal R1(01), R2(01), or R1(03) indicating that image data may be substantially the same and an asynchronous signal indicating that image data may be different. In one or more embodiments, the result signal data RC0_Data, RC1, RC2, and RC3 may be bit data in which high logic-level bit data "1" indicating that image data may be substantially the same and low logic-level bit data "0" indicating that image data may be different may be combined. In other words, the second logic gate circuits LG1 through LG3 may align the synchronous signals, which indicate that image data are substantially the same, with the timing clock signals and output the results sequentially. The result signal data may combine synchronous signals showing that image data are substantially the same with asynchronous signals showing differences. High logic-level bits "1" indicate substantially similar image data, while low logic-level bits "0" indicate differences.

The modulation circuit unit ITP may be configured to interpolate image data of pixels SP which may be different among image data of adjacent pixels SP of substantially the same color according to preset interpolation characteristics in response to the result signal data RC0_Data, RC1, RC2, and RC3 input through the first serial comparison circuit unit TP1 and the second logic gate circuits LG1 through LG3, respectively. For example, the modulation circuit unit ITP may be configured to generate interpolated image data RGB only for pixels SP whose image data may be different from those of adjacent pixels SP in response to the input result signal data RC0_Data, RC1, RC2, and RC3. In one or more embodiments, the modulation circuit unit ITP may include a plurality of data modulation circuit units IT1 through IT4 which may be configured to be turned on or turned off by sequentially and respectively responding to the result signal data RC0_Data, RC1, RC2, and RC3 input from the data comparison unit CPT, and, if (e.g., when) turned on, may be configured to generate and output the interpolated image data RGB by interpolating each input image data according to preset interpolation characteristics.

Figure 6:
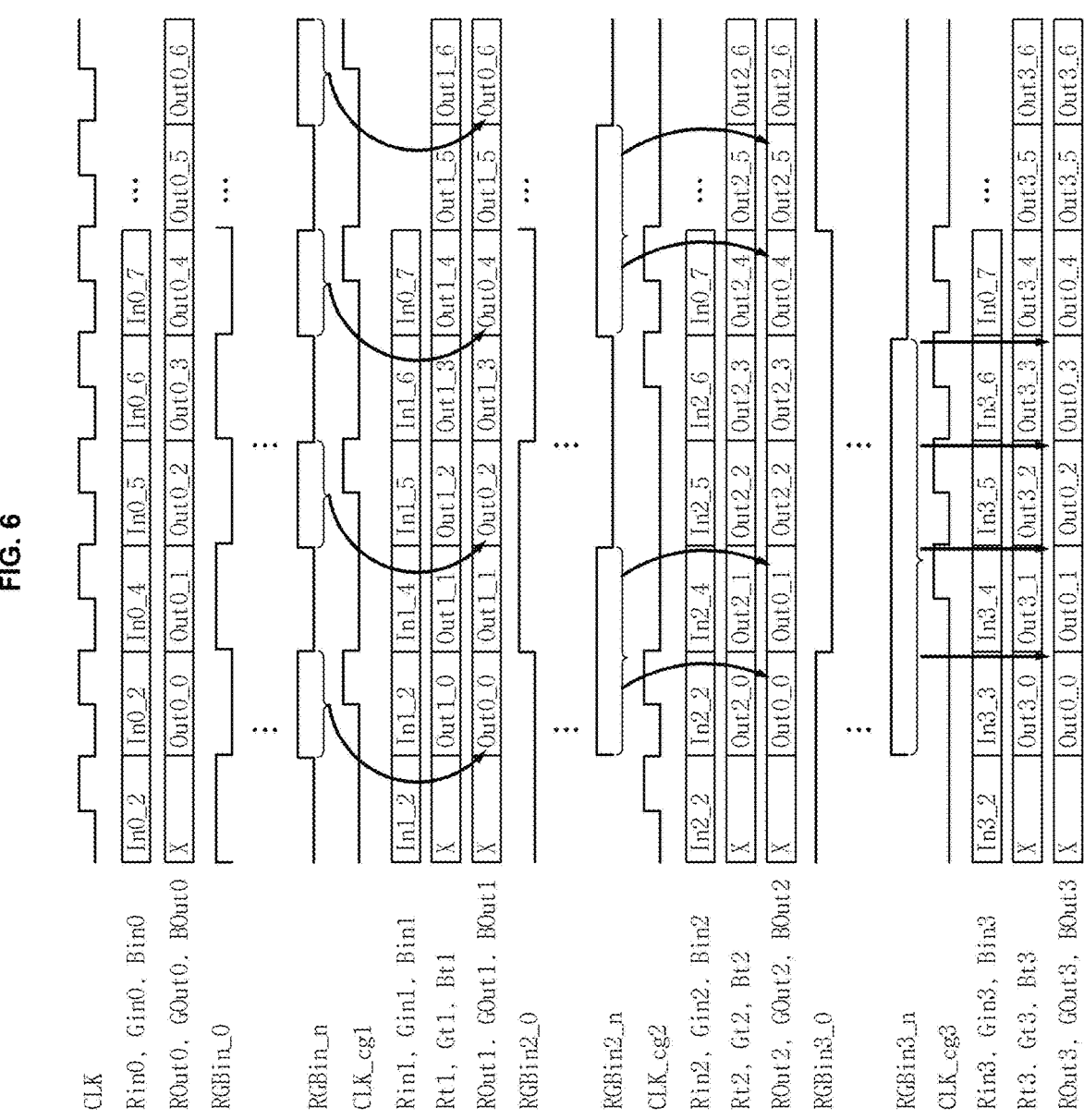
FIG. 6 is a waveform diagram illustrating data output timings of first through fourth data modulation circuit units illustrated in FIG. 5.

FIG. 6 is a waveform diagram illustrating data output timings of the first through fourth data modulation circuit units IT1 through IT4 illustrated in FIG. 5.

Referring to FIGS. 5 and 6, the second logic gate circuits LG1 through LG3 may be configured to match the synchronous signals R1(01), R2(01), and R3(01), which may be generated if (e.g., when) it is determined that image data are substantially the same based on the comparison result in at least one selected from among the serial and parallel structures, with the output timings of the timing clock signals CLK and sequentially output the matching results. In FIG. 6, the timing clock signals CLK may be substantially the same clock signals acting or serving as first result signal data RC0_Data of the data comparison unit CPT. In one or more embodiments, in FIG. 6, second result signal data RC1 may be illustrated acting or serving as a CLK_cg1 clock waveform, third result signal data RC2 may be illustrated acting or serving as a CLK_cg2 clock waveform, and fourth result signal data RC3 may be illustrated acting or serving as a CLK_cg3 clock waveform.

RGBin_0 through RGBin_n clocks may be output timing clocks of the second data modulation circuit unit IT2, and RGBin2_0 through RGBin2_n clocks may be output timing clocks of the third data modulation circuit unit IT3. In one or more embodiments, RGBin3_0 through RGBin3_n clocks may be output timing clocks of the fourth data modulation circuit unit IT4.

Referring to FIG. 6 together with FIG. 5, the first data modulation circuit unit IT1 may be configured to be turned on during a low-bit data input period of the first result signal data RC0_Data input from the data comparison unit CPT, for example, during a period in which a timing clock signal CLK may be input acting or serving as a low bit of "0". Then, the first data modulation circuit unit IT1 may be configured to interpolate image data R0(Rin0), G0(Gin0), and B0(Bin0) input through the first communication line according to preset interpolation characteristics and output the interpolated image data IT1_out(ROut0, GOut0, BOut0). In one or more embodiments, the first data modulation circuit unit IT1 may be configured to be turned off during a period in which the timing clock signal CLK of the first result signal data RC0_Data may be input acting or serving as high bit data, for example, "1". In one or more embodiments, for pixels SP having substantially the same image data and color as those of an adjacent pixel SP, the first data modulation circuit unit IT1 may be configured to copy interpolated image data IT1_out(ROut0, GOut0, BOut0) of the adjacent pixel SP and output the copied interpolated image data IT1_out(ROut0, GOut0, BOut0).

The second data modulation circuit unit IT2 may be configured to be turned on or turned off in response to a CLK_cg1 clock of the second result signal data RC1 among the result signal data RC0_Data, RC1, RC2, and RC3 of the data comparison unit CPT. If (e.g., when) turned on, the second data modulation circuit unit IT2 may be configured to interpolate image data R1(Rin1), G1(Gin1), and B1(Bin1) input through the second communication line according to preset interpolation characteristics and generate and output the interpolated image data IT2_out(ROut1, GOut1, BOut1).

The second data modulation circuit unit IT2 may be configured to be turned on during a period in which low logic-level bit data of the CLK_cg1 clock of the second result signal data RC1 may be input. Then, the second data modulation circuit unit IT2 may be configured to interpolate the image data R1(Rin1), G1(Gin1), and B1(Bin1) and generate and output the interpolated image data IT2_out (ROut1, GOut1, BOut1). In one or more embodiments, the second data modulation circuit unit IT2 may be configured to be kept turned off during a period in which high logic-level bit data, for example, "1" of the CLK_cg1 clock of the second result signal data RC1 may be input. In one or more embodiments, the second data modulation circuit unit IT2 may be configured to store red, green, and blue valid data Rt1, Gt1, and Bt1 or invalid data separately in a buffer or memory according to a high- or low-level signal of the CLK_cg1 clock.

The third data modulation circuit unit IT3 may be configured to be turned on or turned off in response to a CLK_cg2 clock of the third result signal data RC2 among the result signal data RC0_Data, RC1, RC2, and RC3 of the data comparison unit CPT. If (e.g., when) turned on, the third data modulation circuit unit IT3 may be configured to interpolate image data R2(Rin2), G2(Gin2), and B2(Bin2) input through the third communication line according to preset interpolation characteristics and generate and output the interpolated image data IT3_out(ROut2, GOut2, BOut2).

The third data modulation circuit unit IT3 may be configured to be turned on during a period in which low logic-level bit data of the CLK_cg2 clock of the third result signal data RC2 may be input. Then, the third data modulation circuit unit IT3 may interpolate the image data R2(Rin2), G2(Gin2), and B2(Bin2) and generate and output the interpolated image data IT3_out(Rout2, Gout2, Bout2). In one or more embodiments, the third data modulation circuit unit IT3 may be kept turned off during a period in which high logic-level bit data of the third result signal data RC2 may be input. In one or more embodiments, the third data modulation circuit unit IT3 may be configured to store red, green, and blue valid data Rt2, Gt2, and Bt2 or invalid data separately in a buffer or memory according to a high- or low-level signal of the CLK_cg2 clock.

The fourth data modulation circuit unit IT4 may be configured to be turned on or turned off in response to a CLK_cg3 clock of the fourth result signal data RC3 among the result signal data RC0_Data, RC1, RC2, and RC3 of the data comparison unit CPT. If (e.g., when) turned on, the fourth data modulation circuit unit IT4 may be configured to interpolate image data R3 (Rin3), G3 (Gin3), and B3 (Bin3) input through the fourth communication line according to preset interpolation characteristics and generate and output the interpolated image data IT4_out(ROut3, GOut3, BOut3).

The fourth data modulation circuit unit IT4 may be configured to be turned on during a period in which a low logic-level CLK_cg3 clock of the fourth result signal data RC3 may be input. Then, the fourth data modulation circuit unit IT4 may interpolate the image data R3 (Rin3), G3 (Gin3), and B3 (Bin3) and generate and output the interpolated image data IT4_out(Rout3, Gout3, Bout3). In one or more embodiments, the fourth data modulation circuit unit IT4 may be kept turned off during a period in which the CLK_cg3 clock of the fourth result signal data RC3 may be input in a high logic state. In one or more embodiments, the fourth data modulation circuit unit IT4 may be configured to store red, green, and blue valid data Rt3, Gt3, and Bt3 or invalid data separately in a buffer or memory according to a high- or low-level signal of the CLK_cg3 clock.

The selective output unit SOT may be configured to selectively output interpolated image data of the pixels SP in response to the result signal data RC0_Data, RC1, RC2, and RC3 input from the data comparison unit CPT or the synchronous signals R1(01), R2(01), and R1(03) of image data of the pixels SP. For example, in response to the synchronous signals R1(01), R2(01), and R1(03) of the image data of the pixels SP, the selective output unit SOT may replace interpolated image data for image data of pixels SP, which may be substantially the same as those of adjacent pixels SP of substantially the same color, with the interpolated image data IT1_out(ROut0, GOut0, BOut0) generated by the first data modulation circuit unit IT1 and output the replaced interpolated image data IT1_out(ROut0, GOut0, BOut0).

In one or more embodiments, the selective output unit SOT may include first through third data switching circuits MX1 though MX3 which may be configured to select the interpolated image data IT1_out(ROut0, GOut0, BOut0) generated by the first data modulation circuit unit IT1 or the interpolated image data IT2_out, IT3_out, and IT4_out respectively generated by the second through fourth modulation circuit units IT2 through IT4 and transmit the selected interpolated image data to the display driver 400. In one or more embodiments, the selective output unit SOT may further include first through third delay circuits Dy1 through Dy3 which may be configured to delay first through third synchronous signals R1(01), R2(01), and R3(01) received from the first logic gate circuits LO1, LO2, and LO3 for a preset period and supply the delayed first through third synchronous signals to R1(01), R2(01), and R3(01) to the first through third data switching circuits MX1 through MX3, respectively.

The first data switching circuit MX1 may be configured to select any one selected from among the interpolated image data IT1_out generated by the first data modulation circuit unit IT1 and the interpolated image data IT2_out generated by the second modulation circuit unit IT2 in response to the first synchronous signal R1(01) input through any one selected from among the first logic gate circuits LO1 through LO3 and the first delay circuit Dy1 and transmit the selected interpolated image data to the display driver 400.

The first data switching circuit MX1 may be configured to transmit the interpolated image data generated by the first data modulation circuit unit IT1 to the display driver 400 during a period in which the first synchronous signal R1(01) may input acting or serving as high logic-level bit data. In one or more embodiments, the first data switching circuit MX1 may be configured to transmit the interpolated image data generated by the second modulation circuit unit IT2 to the display driver 400 during a period in which the first synchronous signal R1(01) may be input acting or serving as low logic-level bit data, for example, "0".

The second data switching circuit MX2 may be configured to select any one selected from among the interpolated image data IT1_out generated by the first data modulation circuit unit IT1 and the interpolated image data IT3_out generated by the third modulation circuit unit IT3 in response to the second synchronous signal R2(01) input through any one selected from among the first logic gate circuits LO1 through LO3 and the second delay circuit Dy2 and transmit the selected interpolated image data to the display driver 400.

The second data switching circuit MX2 may be configured to transmit the interpolated image data generated by the first data modulation circuit unit IT1 to the display driver 400 during a period in which the second synchronous signal R2(01) may be input acting or serving as high logic-level bit data. In one or more embodiments, the second data switching circuit MX2 may be configured to transmit the interpolated image data IT3_out generated by the third modulation circuit unit IT3 to the display driver 400 during a period in which the second synchronous signal R2(01) may be input acting or serving as low logic-level bit data.

The third data switching circuit MX3 may be configured to select any one selected from among the interpolated image data IT1_out generated by the first data modulation circuit unit IT1 and the interpolated image data IT4_out generated by the fourth modulation circuit unit IT4 in response to the third synchronous signal R3(01) input through any one selected from among the first logic gate circuits LO1 through LO3 and the third delay circuit Dy3 and transmit the selected interpolated image data to the display driver 400.

The third data switching circuit MX3 may be configured to transmit the interpolated image data generated by the first data modulation circuit unit IT1 to the display driver 400 during a period in which the third synchronous signal R3(01) may be input acting or serving as high logic-level bit data "1". In one or more embodiments, the third data switching circuit MX3 may be configured to transmit the interpolated image data generated by the fourth modulation circuit unit IT4 to the display driver 400 during a period in which the third synchronous signal R3(01) may be input acting or serving as low logic-level bit data "0".

Figure 7:
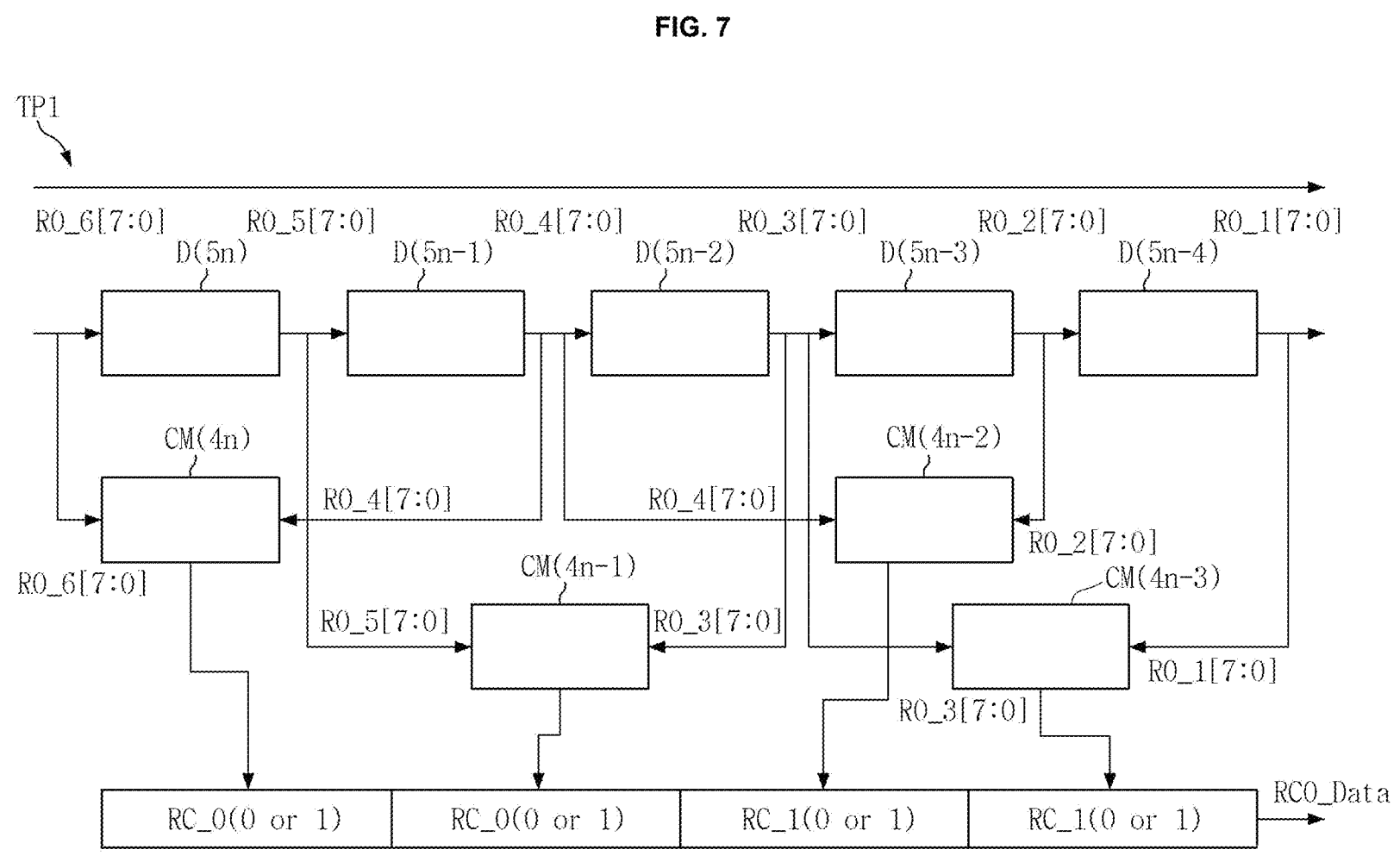

FIG. 7 is a detailed block diagram of a first embodiment of the first serial comparison circuit unit TP1 illustrated in FIG. 5.

Referring to FIG. 7, the first serial comparison circuit unit TP1 may include a plurality of data delay circuit units $D(5n-4)$ through $D(5n)$ and a plurality of data comparison circuit units $CM(4n-3)$ through $CM(4n)$.

The data delay circuit units $D(5n-4)$ through $D(5n)$ may be configured to sequentially delay and output image data $R0\_1[7:0]$ through $R0\_6[7:0]$ of pixels SP of at least any one color (e.g., red) in the serial structure among the image data ImData sequentially input through the first communication line.

The data comparison circuit units $CM(4n-3)$ through $CM(4n)$ may be configured to compare image data respectively delayed by a $(5n-4)^{th}$ delay circuit unit $D(5n-4)$ and a $(5n-2)^{th}$ delay circuit unit $D(5n-2)$ among the data delay circuit units $D(5n-4)$ through $D(5n)$, compare image data respectively delayed by a $(5n-3)^{th}$ delay circuit unit $D(5n-3)$ and a $(5n-1)^{th}$ delay circuit unit $D(5n-1)$, compare image data respectively delayed by the $(5n-2)^{th}$ delay circuit unit $D(5n-2)$ and a $(5n)^{th}$ delay circuit unit $D(5n)$ and compare image data input through the first communication line and image data delayed by the $(5n-1)^{th}$ delay circuit unit $D(5n-1)$ and output the result signal data RC0_Data based on the comparison result.

For example, the first serial comparison circuit unit TP1 among the serial comparison circuit units TP1 through TP4 may be configured to separate and classify the image data ImData sequentially input through the first communication line into red, green, and blue image data $R0[7:0]$, $G0[7:0]$, and $B0[7:0]$ and sequentially compare image data of adjacent pixels SP of substantially the same color for each of red, green, and blue.

The first serial comparison circuit unit TP1 may include the data delay circuit units D(5n−4) through D(5n) and the data comparison circuit units CM(4n−3) through CM(4n) acting or serving as components for comparing the image data R0[7:0], G0[7:0], or B0[7:0] for each color among the image data ImData.

For example, the data delay circuit units D(5n−4) through D(5n) may be configured to sequentially delay and output image data R0_1[7:0] through R0_6[7:0] of pixels SP of at least any one color (e.g., red) in the serial structure among the image data ImData sequentially input through the first communication line. In one or more embodiments, n may be a positive integer.

A $(4n−3)^{th}$ data comparison circuit unit CM(4n−3) among the data comparison circuit units CM(4n−3) through CM(4n) may be configured to compare image data respectively delayed by the $(5n−4)^{th}$ delay circuit unit D(5n−4) and the $(5n−2)^{th}$ delay circuit unit D(5n−2) and output high or low logic-level bit data RC_1 acting or serving as the result signal data RC0_Data according to the comparison result.

A $(4n−2)^{th}$ data comparison circuit unit CM(4n−2) among the data comparison circuit units CM(4n−3) through CM(4n) may be configured to compare image data respectively delayed by the $(5n−3)^{th}$ delay circuit unit D(5n−3) and the $(5n−1)^{th}$ delay circuit unit D(5n−1) and output high or low logic-level bit data RC_1 acting or serving as the result signal data RC0_Data according to the comparison result.

A $(4n−1)^{th}$ data comparison circuit unit CM(4n−1) among the data comparison circuit units CM(4n−3) through CM(4n) may be configured to compare image data respectively delayed by the $(5n−2)^{th}$ delay circuit unit D(5n−2) and the $(5n)^{th}$ delay circuit unit D(5n) and output high or low logic-level bit data RC_0 acting or serving as the result signal data RC0_Data according to the comparison result.

A $(4n)^{th}$ data comparison circuit unit CM(4n) among the data comparison circuit units CM(4n−3) through CM(4n) may be configured to compare image data input through the first communication line and image data delayed by the $(5n−1)^{th}$ delay circuit unit D(5n−1) and output high or low logic-level bit data RC_0 acting or serving as the result signal data RC0_Data according to the comparison result.

The first serial comparison circuit unit TP1 may be configured to output the result signal data RC0_Data for each of red, green, and blue according to the result of comparing adjacent image data using the data comparison circuit units CM(4n−3) through CM(4n). In one or more embodiments, if (e.g., when) image data are substantially the same, high logic-level bit data "1", "11", "111 . . . " may be output, and if (e.g., when) the image data are different, low logic-level bit data "0", "00", "000 . . . " may be output.

Figure 8:
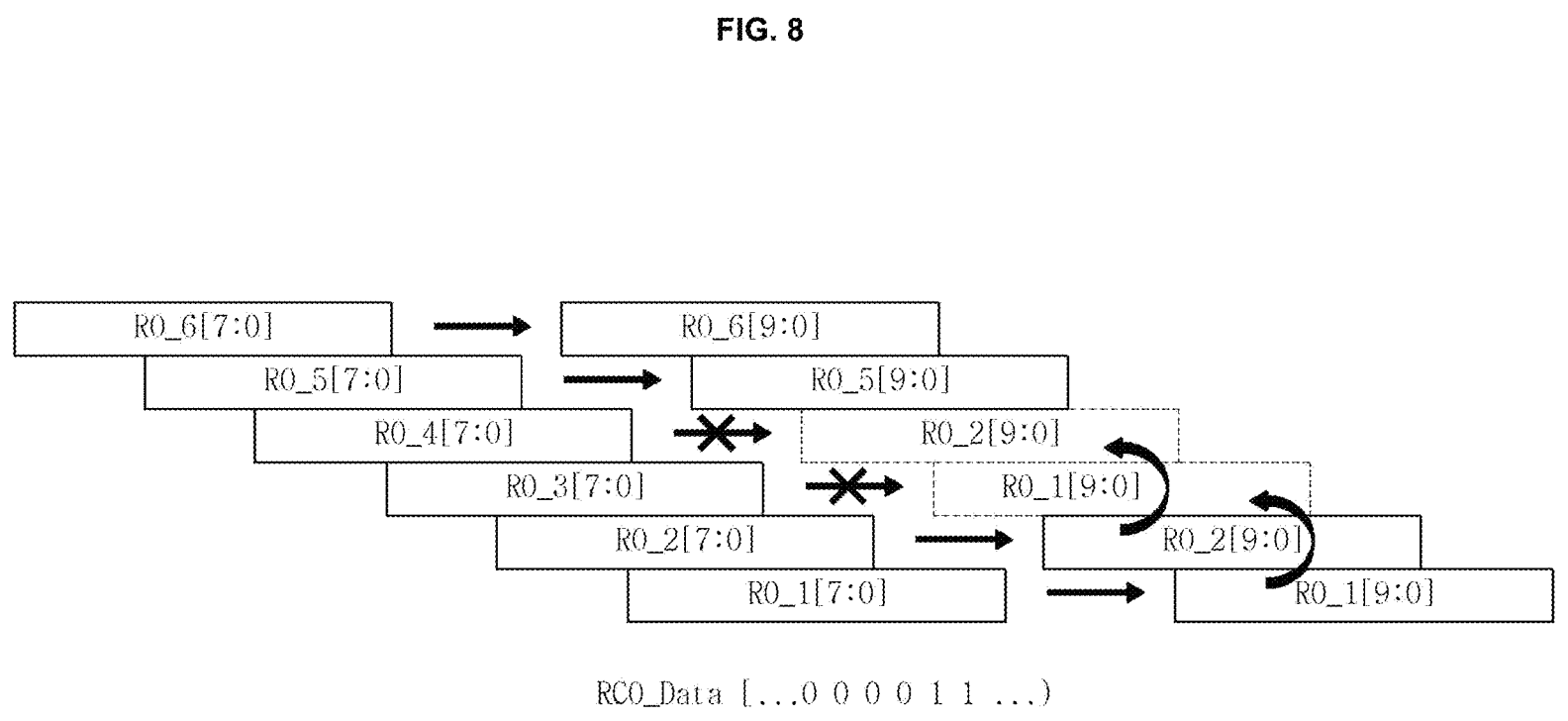

FIG. 8 is a diagram illustrating a data interpolation operation of the first data modulation circuit unit IT1 illustrated in FIG. 5.

Referring to FIG. 8, the first data modulation circuit unit IT1 may be configured to be turned on during a period in which low bit data, for example, "0" of the first result signal data RC0_Data input from the data comparison unit CPT may be input. Then, the first data modulation circuit unit IT1 may interpolate image data R0, G0, and B0 input through the first communication line according to preset interpolation characteristics and output the interpolated image data RGB.

The first data modulation circuit unit IT1 may be configured to be turned off during a period in which high bit data, for example, "1" of the first result signal data RC0_Data may be input. In one or more embodiments, for each pixel SP having substantially the same image data and color as those of an adjacent pixel SP compared, the first data modulation circuit unit IT1 may copy interpolated image data R0_1[9:0] or R0_2[9:0] of the adjacent pixel SP and outputs the copied interpolated image data R0_1[9:0] or R0_2[9:0].

Figure 9:
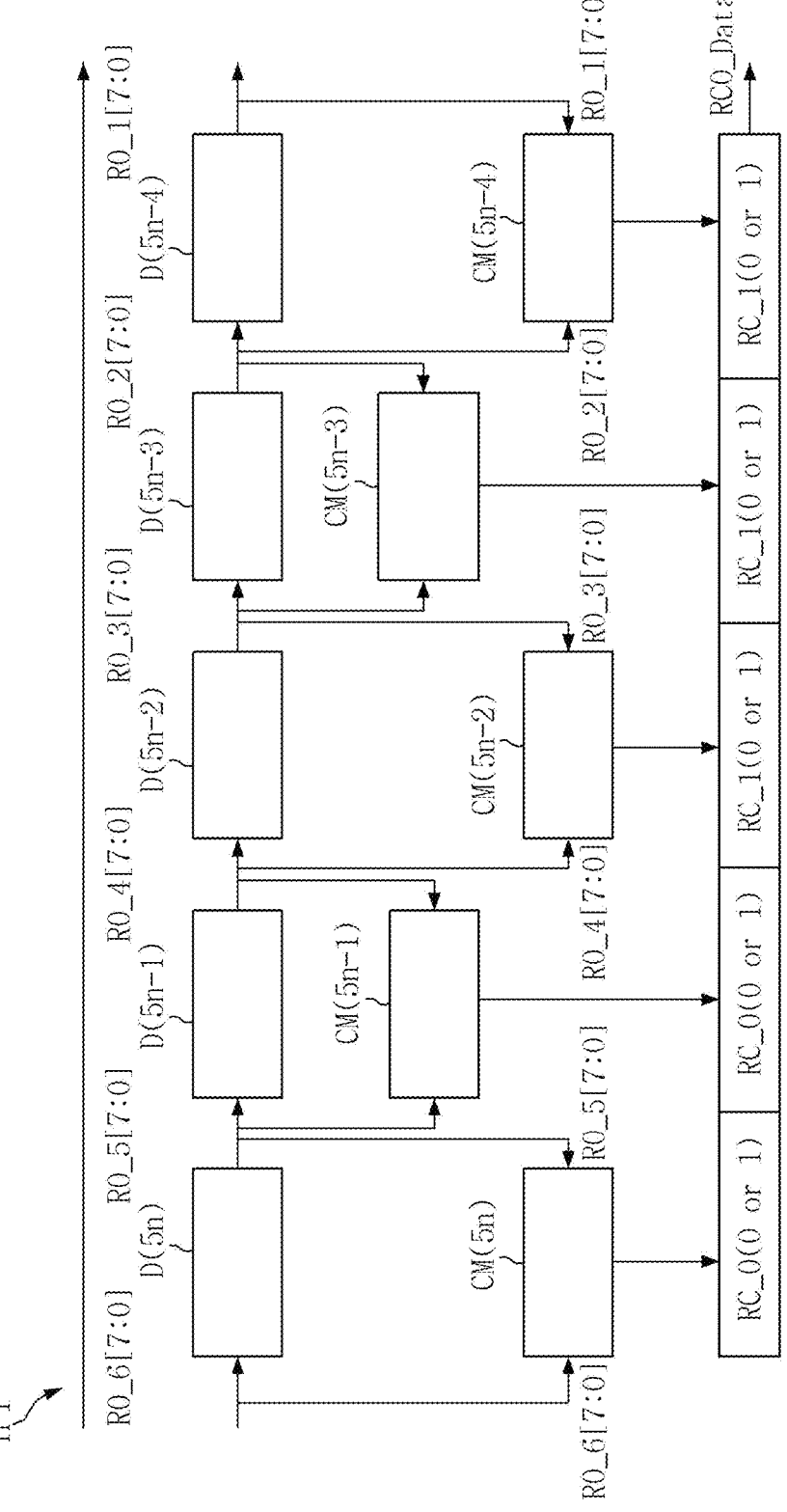
FIG. 9 is a detailed block diagram illustrating a second embodiment of the first serial comparison circuit unit illustrated in FIG. 5.

FIG. 9 is a detailed block diagram illustrating a second embodiment of the first serial comparison circuit unit TP1 illustrated in FIG. 5.

Referring to FIG. 9, a first serial comparison circuit unit TP1 among the serial comparison circuit units TP1 through TP4 may be configured to separate and classify image data ImData sequentially input through the first communication line into red, green, and blue image data R0[7:0], G0[7:0], and B0[7:0] and sequentially compare image data of adjacent pixels SP of substantially the same color for each of red, green, and blue.

The first serial comparison circuit unit TP1 may include a plurality of data delay circuit units D(5n−4) through D(5n) and a plurality of data comparison circuit units CM(5n−4) through CM(5n) acting or serving as components for comparing the image data R0[7:0], G0[7:0], or B0[7:0] for each color among the image data ImData.

For example, the data delay circuit units D(5n−4) through D(5n) may be configured to sequentially delay and output image data R0_1[7:0] through R0_6[7:0] of pixels SP of at least any one color (e.g., red) in a serial structure among the image data ImData sequentially input through the first communication line. In one or more embodiments, n may be a positive integer.

A $(5n−4)^{th}$ data comparison circuit unit CM(5n−4) among the data comparison circuit units CM(5n−4) through CM(5n) may be configured to compare image data respectively delayed by a $(5n−4)^{th}$ delay circuit unit D(5n−4) and a $(5n−3)^{th}$ delay circuit unit D(5n−3) and output high or low logic-level bit data RC_1 acting or serving as result signal data RC0_Data according to the comparison result.

A $(5n−3)^{th}$ data comparison circuit unit CM(5n−3) among the data comparison circuit units CM(5n−4) through CM(5n) may be configured to compare image data respectively delayed by the $(5n−3)^{th}$ delay circuit unit D(5n−3) and a $(5n−2)^{th}$ delay circuit unit D(5n−2) and output high or low logic-level bit data RC_1 acting or serving as the result signal data RC0_Data according to the comparison result.

A $(5n−2)^{th}$ data comparison circuit unit CM(5n−2) among the data comparison circuit units CM(5n−4) through CM(5n) may be configured to compare image data respectively delayed by the $(5n−2)^{th}$ delay circuit unit D(5n−2) and a $(5n−1)^{th}$ delay circuit unit D(5n−1) and output high or low logic-level bit data RC_1 acting or serving as the result signal data RC0_Data according to the comparison result.

A $(5n)^{th}$ data comparison circuit unit CM(5n) among the data comparison circuit units CM(5n−4) through CM(5n) may be configured to compare image data input through the first communication line and image data delayed by a $(5n)^{th}$ delay circuit unit D(5n) and output high or low logic-level bit data RC_0 acting or serving as the result signal data RC0_Data according to the comparison result.

The first serial comparison circuit unit TP1 may be configured to output the result signal data RC0_Data for each of red, green, and blue according to the result of comparing adjacent image data using the data comparison circuit units CM(5n−4) through CM(5n). In one or more embodiments, if (e.g., when) image data are substantially the same, high logic-level bit data "1", "11", "111 . . . " may be output, and if (e.g., when) the image data are different, low logic-level bit data "0", "00", "000 . . . " may be output.

Figure 10:
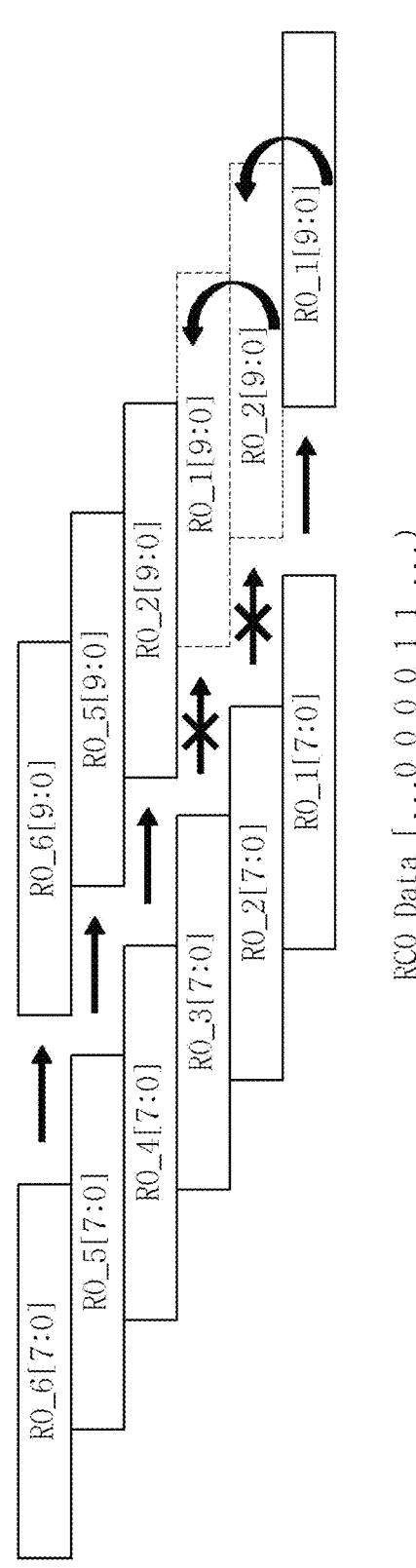
FIG. 10 is a diagram illustrating a data interpolation operation of the first data modulation circuit unit illustrated in FIG. 5.

FIG. 10 is a diagram illustrating a data interpolation operation of the first data modulation circuit unit IT1 illustrated in FIG. 5.

Referring to FIG. 10, the first data modulation circuit unit IT1 may be configured to be turned on during a period in which low bit data, for example, "0" of the first result signal data RC0_Data input from the data comparison unit CPT may be input. Then, the first data modulation circuit unit IT1 may be configured to interpolate image data R0, G0, and B0 input through the first communication line according to preset interpolation characteristics and output the interpolated image data RGB.

The first data modulation circuit unit IT1 may be configured to be turned off during a period in which high bit data, for example, "1" of the first result signal data RC0_Data may be input. In one or more embodiments, for each pixel SP having substantially the same image data and color as those of an adjacent pixel SP compared, the first data modulation circuit unit IT1 may copy interpolated image data R0_1[9:0] of the adjacent pixel SP and output the copied interpolated image data R0_1[9:0].

Figure 11:
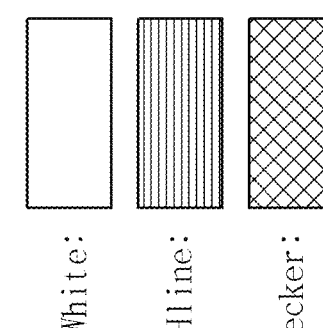
FIG. 11 is a table illustrating a power consumption reduction effect according to the on/off and data interpolation operations of first through $n^{th}$ data modulation circuit units.

FIG. 11 is a table illustrating a power consumption reduction effect according to the on/off and data interpolation operations of first through n$^{th}$ data modulation circuit units.

Referring to FIG. 11, the data interpolator 500 may be configured to reduce power consumption (or to reduce a degree or occurrence of power consumption) due to an image data interpolation operation by controlling the timing of an on-off operation according to identity characteristics caused by the duplication of image data of red, green, blue, and white pixels SP. In one or more embodiments, the current consumption reduction effect may be further improved or enhanced compared to the amount of power consumed if (e.g., when) low power is used according to the on-off control operation of the data interpolator 500.

It may be seen that the amount of current consumed if (e.g., when) low power is not used (1. current consumed) because the on-off control operation of the data interpolator 500 is not performed and the amount of power consumed if (e.g., when) low power is used (2. current consumed) because the on-off control operation of the data interpolator 500 is performed may be different by the amount of delta current. For example, the current consumption reduction effect may vary according to the pattern shape of a displayed image. For example, the current consumption reduction effect may be greater when a checkered pattern is displayed than when a white pattern or a horizontal line pattern is displayed.

One or more embodiments of the present disclosure provide an electronic device including a display device as described in one or more embodiments.

The display device may include: a display panel; display pixels in a display area of the display panel; light sensing pixels in the display area together with the display pixels; infrared light emitting pixels in the display area together with the display pixels; a display scan driver to drive the display pixels and the light sensing pixels to emit light; a light sensing scan driver to drive the light sensing pixels to detect light; and a main driving circuit to detect pulse wave signals of a user utilizing light sensing signals received through the light sensing pixels and to measure biometric information.

The main driving circuit may be to separate and to generate blood vessel image data from image data for a touch area during a user's touch position detection period and to receive the light sensing signals of a light receiving area by distinguishing the light receiving area according to the blood vessel image data in the display area during a user's biometric information detection period.

A person of ordinary skill in the art, in view of the present disclosure in its entirety, would appreciate that each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner unless otherwise stated or implied.

In the context of the present application and unless otherwise defined, the terms "use," "using," and "used" may be considered synonymous with the terms "utilize," "utilizing," and "utilized," respectively.

A display device, a device for manufacturing the same and/or any other relevant devices or components according to embodiments of the present invention described herein may be implemented utilizing any suitable hardware, firmware (e.g. an application-specific integrated circuit), software, or a combination of software, firmware, and hardware. For example, the various components of the device may be formed on one integrated circuit (IC) chip or on separate IC chips. Further, the various components of the device may be implemented on a flexible printed circuit film, a tape carrier package (TCP), a printed circuit board (PCB), or formed on one substrate. Further, the various components of the device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the present disclosure.

As used herein, the term "substantially," "about," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations, or within +30%, +20%, +10%, or +5% of the stated value.

Herein, the use of the term "may," when describing embodiments of the present invention, refers to "one or more embodiments of the present invention."

In concluding the detailed description, those skilled in the art will appreciate that one or more suitable variations and modifications may be made to the embodiments without substantially departing from the spirit and scope of the present disclosure. Therefore, the disclosed embodiments of the present disclosure are used in a generic and descriptive sense only and not for purposes of limitation.

What is claimed is:

1. A display device comprising:

a display panel in which a plurality of pixels are arranged in a display area to display an image;

a scan driver to drive gate lines of the display area;

a data driver to drive data lines of the display area;

a display driver to sort interpolated image data according to resolution of the display area, supply the sorted interpolated image data to the data driver, and control driving timings of the scan driver and the data driver; and a data interpolator to modulate and interpolate image data of pixels, which are input from outside, according to driving characteristics of the display panel and generate and output the interpolated image data, wherein the data interpolator is to interpolate grayscale values or luminance values of the image data of the pixels, compare image data of adjacent pixels in the process of interpolating the image data of the pixels which are sequentially input and, when the image data of the adjacent pixels are matching within one or more standard deviations according to a result of interpolating the grayscale values or the luminance values, apply previously generated interpolated image data as interpolated image data for the image data of the adjacent pixels.

2. The display device as claimed in claim 1, wherein the data interpolator is to interpolate grayscale values and luminance values of the image data of the pixels according to at least one selected from among resolution characteristics, chrominance characteristics, and driving frequency characteristics of the display area and copy and apply previously generated interpolated image data as interpolated image data for image data of pixels whose image data are matching within one or more standard deviations according to the result of interpolating the image data of the adjacent pixels.

3. The display device as claimed in claim 2, wherein the data interpolator is to generate interpolated image data for image data of pixels whose image data are different among image data of matching red, green, blue, or white adjacent pixels by interpolating grayscale or luminance values or number of bits of the image data according to preset interpolation characteristics and, for image data of pixels whose image data are matching within one or more standard deviations among the image data of the matching red, green, blue, or white adjacent pixels, copy and apply interpolated image data of an adjacent pixel having within one or more standard deviations matching image data as interpolated image data.

4. The display device as claimed in claim 1, wherein the data interpolator comprises:

a data comparison unit to sequentially compare the image data of the pixels, which are input in series and parallel from the outside, in serial and parallel states to generate a comparison result, and output result signal data in parallel based on the comparison result;

a modulation circuit unit to generate interpolated image data by interpolating image data of pixels, which are different from those of matching red, green, blue, or white adjacent pixels, according to preset interpolation characteristics in response to the result signal data; and a selective output unit to replace interpolated image data for image data of pixels, which are matching within one or more standard deviations as those of matching red, green, blue, or white adjacent pixels, with interpolated image data generated by the modulation circuit unit in response to the result signal data and output the replaced interpolated image data.

5. The display device as claimed in claim 4, wherein the data comparison unit comprises:

a plurality of serial comparison circuit units to sequentially receive the image data of the pixels in a serial structure through compression circuits connected to communication lines in a parallel structure or through the communication lines, respectively, sequentially compare adjacent image data of matching red, green, blue, or white pixels among the image data input in the serial structure, and output result signal data based on the comparison result;

at least one parallel comparison circuit unit to sequentially compare, for each color, the image data of the pixels, which are input in the parallel structure through the communication lines in the parallel structure, with image data of the pixels which are input through another communication line and output identical data judgement signals respectively for the communication lines in the parallel structure based on the comparison result;

a plurality of first logic gate circuits, each to compare any one selected from among the result signal data with any one selected from among the identical data judgement signals for the communication lines in the parallel structure, and respectively output synchronous signals of the image data of the pixels compared in the serial structure and the parallel structure; and a plurality of second logic gate circuits to match timing clock signals from the outside with output timings of the synchronous signals of the image data respectively output through the first logic gate circuits and respectively output result signal data based on the result of comparing adjacent image data in series and parallel.

6. The display device as claimed in claim 5, wherein the compression circuits are arranged to correspond one-to-one to the communication lines in the parallel structure, compress the number of bits of the image data of the pixels which are input in the serial structure through the communication lines, respectively, and supply the compressed image data to corresponding serial comparison circuit units, respectively.

7. The display device as claimed in claim 5, wherein a first serial comparison circuit unit among the plurality of serial comparison circuit units comprises:

a plurality of data delay circuit units to sequentially delay and output image data of pixels of at least any one color in the serial structure among image data sequentially input through a first communication line among the communication lines in the parallel structure; and a plurality of data comparison circuit units to compare image data respectively delayed by a $(5n-4)$-th delay circuit unit and a $(5n-2)$-th delay circuit unit among the data delay circuit units, compare image data respectively delayed by a $(5n-3)$-th delay circuit unit and a $(5n-1)$-th delay circuit unit, compare image data respectively delayed by the $(5n-2)$-th delay circuit unit and a $(5n)$-th delay circuit unit, compare image data input through the first communication line and image data delayed by the $(5n-1)$-th delay circuit unit, and output the result signal data based on the comparison result.

8. The display device as claimed in claim 7, wherein a first data modulation circuit unit of the modulation circuit unit is to turn on during a period, in which low bit data of first result signal data among the result signal data is input, to interpolate the image data of the pixels input through the first communication line and to generate the interpolated image data and is to turn off during a period, in which high bit data of the first result signal data is input, to copy and replace interpolated image data for image data of matching red, green, blue, or white adjacent pixels compared with each other and output the copied and replaced interpolated image data.

9. The display device as claimed in claim 5, wherein a first serial comparison circuit unit among the plurality of serial comparison circuit units comprises:

a plurality of data delay circuit units to sequentially delay and output image data of pixels of at least any one color in the serial structure among image data sequentially input through a first communication line among the communication lines in the parallel structure; and a plurality of data comparison circuit units to compare image data respectively delayed by a (5n−4)-th delay circuit unit and a (5n−3)-th delay circuit unit among the data delay circuit units, compare image data respectively delayed by the (5n−3)-th delay circuit unit and a (5n−2)-th delay circuit unit, compare image data respectively delayed by the (5n−2)-th delay circuit unit and a (5n−1)-th delay circuit unit, compare image data respectively delayed by the (5n−1)-th delay circuit unit and a (5n)-th delay circuit unit, compare image data input through the first communication line and image data delayed by the (5n)-th delay circuit unit, and output the result signal data based on the comparison result.

10. The display device as claimed in claim 9, wherein a first data modulation circuit unit of the modulation circuit unit is to turn on during a period, in which low bit data of first result signal data among the result signal data is input, to interpolate the image data of the pixels input through the first communication line, and to generate the interpolated image data and is to turn off during a period, in which high bit data of the first result signal data is input, to copy and replace interpolated image data for image data of matching red, green, blue, or white adjacent pixels compared with each other and output the copied and replaced interpolated image data.

11. A display device comprising:

a display panel in which a plurality of pixels are arranged in a display area to display an image;

a scan driver to drive gate lines of the display area;

a data driver to drive data lines of the display area;

a display driver to control driving timings of the scan driver and the data driver and sequentially supply interpolated image data to the data driver; and a data interpolator to modulate and interpolate image data of pixels, which are input from an outside, according to driving characteristics of the display panel and generate and output the interpolated image data, wherein the data interpolator is to interpolate grayscale values and luminance values of the image data of the pixels according to at least one selected from among resolution characteristics, chrominance characteristics, and driving frequency characteristics of the display area, compare image data of adjacent pixels in the process of interpolating the image data of the pixels, and, when the image data of the adjacent pixels are matching within one or more standard deviations, apply previously generated interpolated image data as interpolated image data for the image data of the adjacent pixels.

12. The display device as claimed in claim 11, wherein the data interpolator is to generate interpolated image data for image data of pixels whose image data are different among image data of matching red, green, blue, or white adjacent pixels by interpolating grayscale or luminance values or number of bits of the image data according to preset interpolation characteristics and, for image data of pixels whose image data are matching within one or more standard deviations among the image data of the matching red, green, blue, or white adjacent pixels, copy and supply interpolated image data of an adjacent pixel having matching within one or more standard deviations image data as interpolated image data.

13. The display device as claimed in claim 12, wherein the data interpolator comprises:

a data comparison unit to sequentially compare the image data of the pixels, which are input in series and parallel from the outside, in serial and parallel states to generate a comparison result, and output result signal data in parallel based on the comparison result;

a modulation circuit unit to generate interpolated image data by interpolating image data of pixels, which are different from those of matching red, green, blue, or white adjacent pixels, according to preset interpolation characteristics in response to the result signal data; and a selective output unit to replace interpolated image data for image data of pixels, which are matching within one or more standard deviations as those of matching red, green, blue, or white adjacent pixels, with interpolated image data generated by the modulation circuit unit in response to the result signal data and output the replaced interpolated image data.

14. The display device as claimed in claim 13, wherein the data comparison unit comprises:

a plurality of serial comparison circuit units to sequentially receive the image data of the pixels in a serial structure through compression circuits connected to communication lines in a parallel structure or through the communication lines, respectively, sequentially compare adjacent matching red, green, blue, or white image data among the image data input in the serial structure, and output result signal data based on the comparison result;

at least one parallel comparison circuit unit to sequentially compare, for each color, the image data of the pixels, which are input in the parallel structure through the communication lines in the parallel structure, with image data of the pixels which are input through another communication line and output identical data judgement signals respectively for the communication lines in the parallel structure based on the comparison result;

a plurality of first logic gate circuits, each to compare any one selected from among the result signal data with any one selected from among the identical data judgement signals for the communication lines in the parallel structure, and respectively output synchronous signals of the image data of the pixels compared in the serial structure and the parallel structure; and a plurality of second logic gate circuits to match timing clock signals from the outside with output timings of the synchronous signals of the image data respectively output through the first logic gate circuits and respectively output result signal data based on the result of comparing adjacent image data in series and parallel.

15. The display device as claimed in claim 14, wherein a first serial comparison circuit unit among the plurality of serial comparison circuit units comprises:

a plurality of data delay circuit units to sequentially delay and output image data of pixels of at least any one color in the serial structure among image data sequentially input through a first communication line among the communication lines in the parallel structure; and a plurality of data comparison circuit units to compare image data respectively delayed by a (5n−4)-th delay circuit unit and a (5n−2)-th delay circuit unit among the data delay circuit units, compare image data respectively delayed by a (5n−3)-th delay circuit unit and a (5n−1)-th delay circuit unit, compare image data respectively delayed by the (5n−2)-th delay circuit unit and a (5n)-th delay circuit unit, compare image data input through the first communication line and image data delayed by the (5n−1)-th delay circuit unit, and output the result signal data based on the comparison result.

16. The display device as claimed in claim 15, wherein a first data modulation circuit unit of the modulation circuit unit is to turn on during a period, in which low bit data of first result signal data among the result signal data is input, to interpolate the image data of the pixels input through the first communication line and generate the interpolated image data and is to turn off during a period, in which high bit data of the first result signal data is input, to copy and replace interpolated image data for image data of matching red, green, blue, or white adjacent pixels compared with each other and output the copied and replaced interpolated image data.

17. The display device as claimed in claim 14, wherein a first serial comparison circuit unit among the plurality of serial comparison circuit units comprises:

a plurality of data delay circuit units to sequentially delay and output image data of pixels of at least any one color in the serial structure among image data sequentially input through a first communication line among the communication lines in the parallel structure; and a plurality of data comparison circuit units to compare image data respectively delayed by a (5n−4)-th delay circuit unit and a (5n−3)-th delay circuit unit among the data delay circuit units, compare image data respectively delayed by the (5n−3)-th delay circuit unit and a (5n−2)-th delay circuit unit, compare image data respectively delayed by the (5n−2)-th delay circuit unit and a (5n−1)-th delay circuit unit, compare image data respectively delayed by the (5n−1)-th delay circuit unit and a (5n)-th delay circuit unit, compare image data input through the first communication line and image data delayed by the (5n)-th delay circuit unit, and output the result signal data based on the comparison result.

18. The display device as claimed in claim 17, wherein a first data modulation circuit unit of the modulation circuit unit is to turn on during a period, in which low bit data of first result signal data among the result signal data is input, to interpolate the image data of the pixels input through the first communication line and generate the interpolated image data and is to turn off during a period, in which high bit data of the first result signal data is input, to copy previously generated interpolated image data and output the copied interpolated image data as interpolated image data for image data of matching red, green, blue, or white adjacent pixels compared with each other.

19. An electronic device comprising a display device, wherein the display device comprises:

a display panel;

display pixels in a display area of the display panel;

light sensing pixels in the display area together with the display pixels;

infrared light emitting pixels in the display area together with the display pixels;

a display scan driver to drive the display pixels and the light sensing pixels to emit light;

a light sensing scan driver to drive the light sensing pixels to detect light; and a main driving circuit to detect pulse wave signals of a user utilizing light sensing signals received through the light sensing pixels and to measure biometric information, wherein the main driving circuit is configured to separate and to generate blood vessel image data from image data for a touch area during a user's touch position detection period and to receive the light sensing signals of a light receiving area by distinguishing the light receiving area according to the blood vessel image data in the display area during a user's biometric information detection period.

* * * * *